(12) United States Patent
Hirai et al.

(10) Patent No.: US 11,902,475 B2
(45) Date of Patent: Feb. 13, 2024

(54) DIAGNOSTIC SYSTEM FOR DIAGNOSING IMAGE FORMING APPARATUS USING IMAGE FORMED BY IMAGE FORMING APPARATUS

(71) Applicant: CANON KABUSHIKI KAISHA, Tokyo (JP)

(72) Inventors: Masahide Hirai, Shizuoka (JP); Kuniaki Kasuga, Shizuoka (JP); Shun-ichi Ebihara, Shizuoka (JP); Mahito Yoshioka, Shizuoka (JP); Hiroshi Kataoka, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/819,192

(22) Filed: Aug. 11, 2022

(65) Prior Publication Data
US 2023/0164275 A1    May 25, 2023

(30) Foreign Application Priority Data

Sep. 1, 2021  (JP) ................................. 2021-142697
Sep. 1, 2021  (JP) ................................. 2021-142698

(51) Int. Cl.
| | |
|---|---|
| *H04N 1/46* | (2006.01) |
| *H04N 1/00* | (2006.01) |
| *H04N 1/60* | (2006.01) |
| *H04N 1/32* | (2006.01) |

(52) U.S. Cl.
CPC ..... *H04N 1/00029* (2013.01); *H04N 1/00005* (2013.01); *H04N 1/00039* (2013.01); *H04N 1/00045* (2013.01); *H04N 1/00286* (2013.01); *H04N 1/00395* (2013.01); *H04N 1/32641* (2013.01); *H04N 1/6044* (2013.01)

(58) Field of Classification Search
None
See application file for complete search history.

(56) References Cited

U.S. PATENT DOCUMENTS

| | | | | |
|---|---|---|---|---|
| 2011/0019244 A1* | 1/2011 | Uwatoko | ........... | H04N 1/00053 358/448 |
| 2011/0019245 A1* | 1/2011 | Adachi | .............. | H04N 1/00474 358/448 |
| 2019/0281171 A1* | 9/2019 | Hayashi | ............. | H04N 1/00045 |
| 2019/0306328 A1* | 10/2019 | Kodama | ........... | H04N 1/00045 |

(Continued)

FOREIGN PATENT DOCUMENTS

| | | |
|---|---|---|
| JP | 2002-125135 A | 4/2002 |
| JP | 2005-205682 A | 8/2005 |

(Continued)

*Primary Examiner* — Dung D Tran
(74) *Attorney, Agent, or Firm* — VENABLE LLP

(57) ABSTRACT

A diagnostic system may comprise an image forming apparatus that forms a diagnostic image on a sheet and an image capturing apparatus that captures an image of the sheet on which the diagnostic image is formed and which has been discharged from the image forming apparatus, and outputs the image captured as a sheet image. The image capturing apparatus may make a diagnosis for a component of the image forming apparatus based on a position of an image deficiency in the sheet image, and output a diagnosis result for the component of the image forming apparatus.

24 Claims, 25 Drawing Sheets

(56) References Cited

U.S. PATENT DOCUMENTS

| | | | |
|---|---|---|---|
| 2019/0310576 A1* | 10/2019 | Tomii | G03G 15/0131 |
| 2020/0236225 A1* | 7/2020 | Hongo | H04N 1/00031 |
| 2020/0301336 A1* | 9/2020 | Tsuchiya | G03G 15/553 |
| 2022/0206425 A1* | 6/2022 | Miyamoto | H04N 1/00076 |
| 2022/0210293 A1* | 6/2022 | Sato | H04N 1/58 |

FOREIGN PATENT DOCUMENTS

| | | |
|---|---|---|
| JP | 5164458 B2 | 3/2013 |
| JP | 6350474 B2 | 7/2018 |
| JP | 2019-174758 A | 10/2019 |
| JP | 2020-53815 A | 4/2020 |
| JP | 2020-140366 A | 9/2020 |
| JP | 2021-16997 A | 2/2021 |

\* cited by examiner

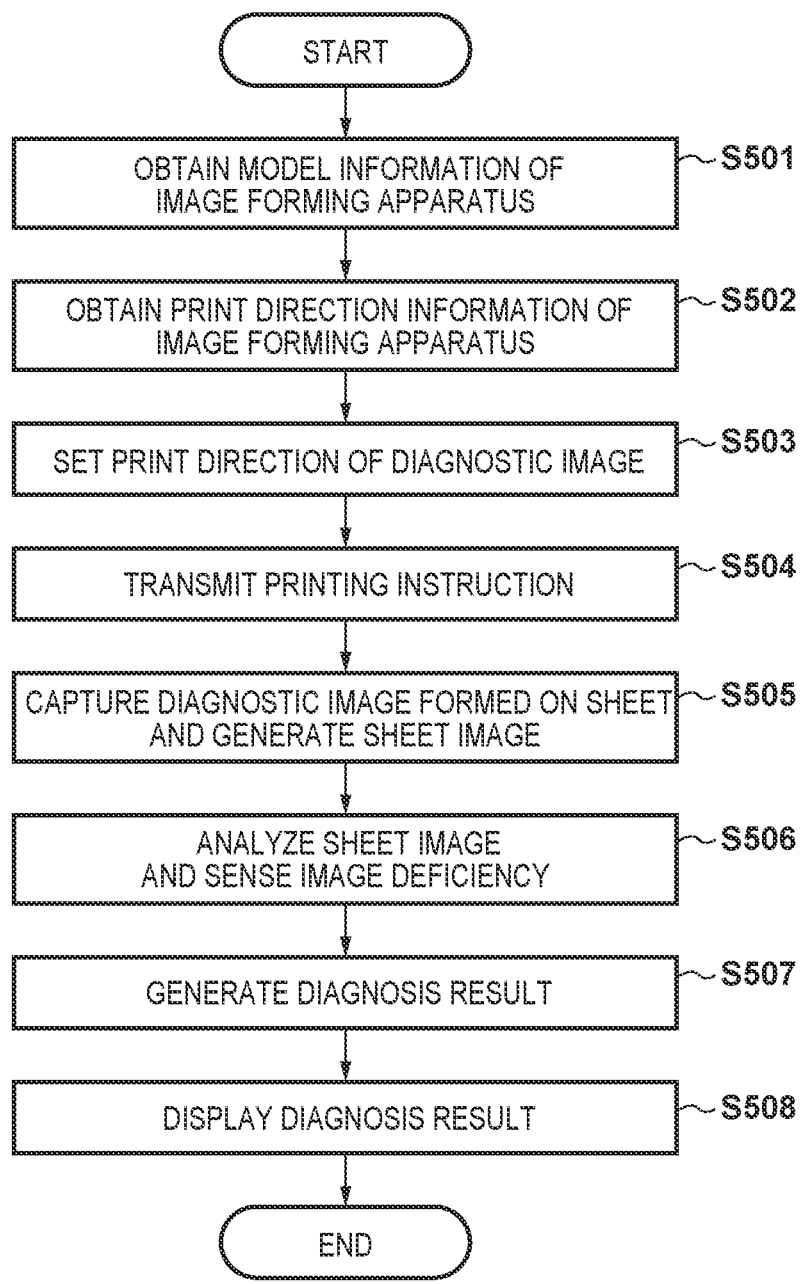

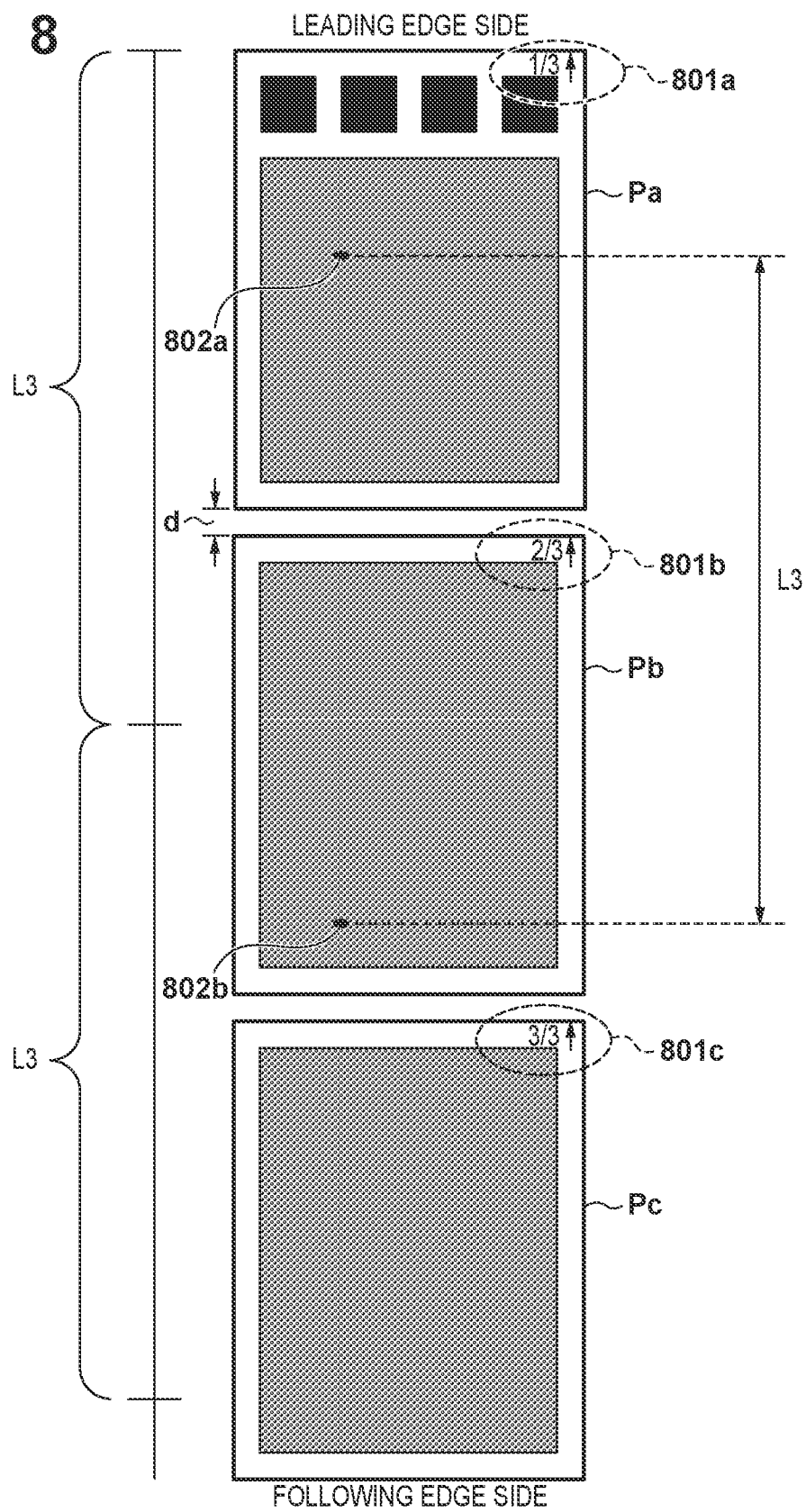

HEADER SIDE
1000
FOOTER SIDE

LEADING EDGE SIDE
208e
L5
FOLLOWING EDGE SIDE

F I G. 21

| FIRST EMBODIMENT U1, V1=297mm | COMPARATIVE EXAMPLE 1 U0=285mm | COMPARATIVE EXAMPLE 2 V0=305mm |
|---|---|---|
| L2=75.4mm | L2=72.4mm | L2=77.4mm |
| CAUSATIVE COMPONENT : PHOTOSENSITIVE MEMBER (CORRECT) | CAUSATIVE COMPONENT : PRESSURE ROLLER (INCORRECT) | CAUSATIVE COMPONENT : FIXING ROLLER (INCORRECT) |

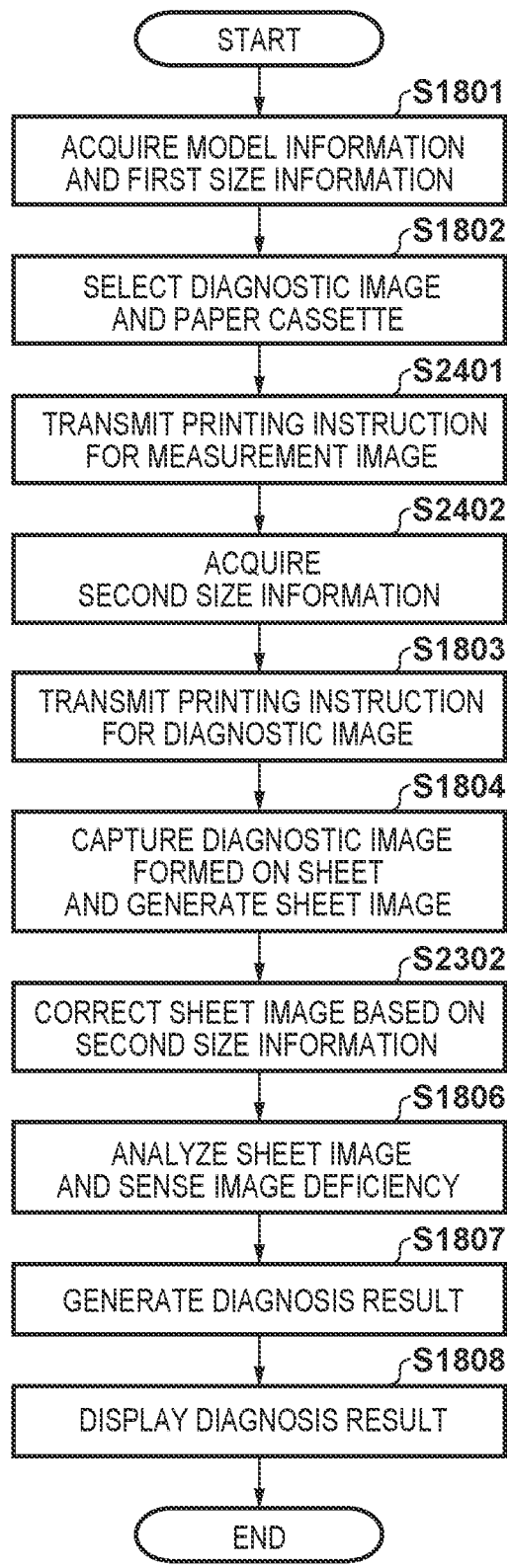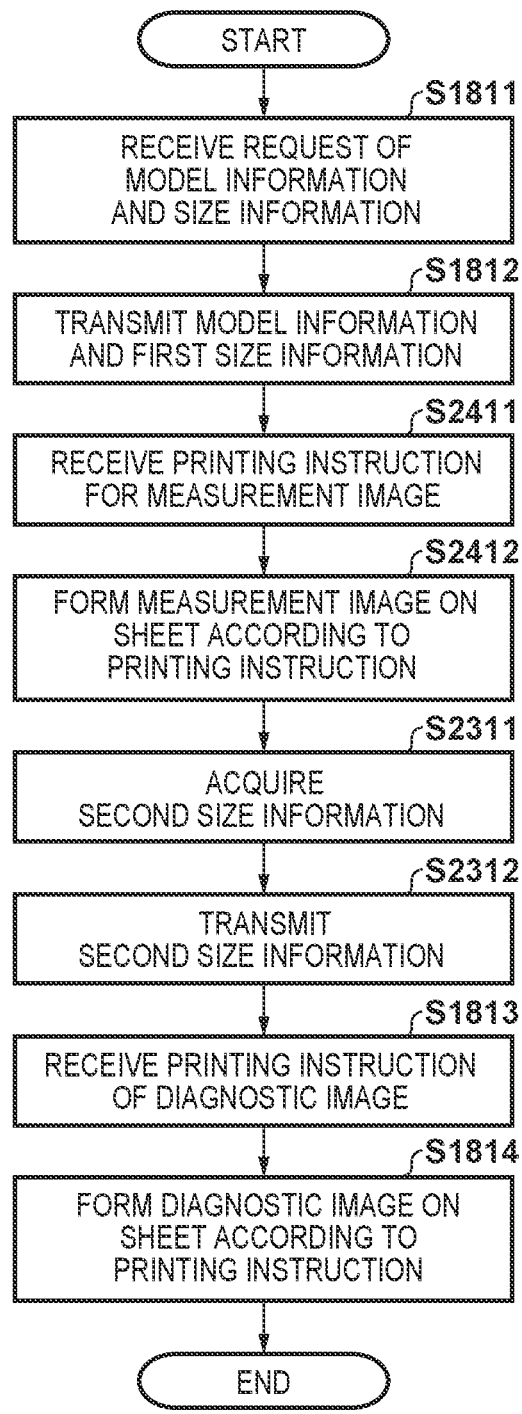

DIAGNOSTIC SYSTEM FOR DIAGNOSING IMAGE FORMING APPARATUS USING IMAGE FORMED BY IMAGE FORMING APPARATUS

BACKGROUND OF THE INVENTION

Field of the Invention

The present invention relates to a diagnostic system for diagnosing an image forming apparatus using an image formed by the image forming apparatus.

Description of the Related Art

When components of an image forming apparatus reach the end of their useful life, image deficiencies may occur. Japanese Patent No. 5164458 describes identifying components that cause image deficiencies by reading an image on a sheet using an image sensor built into the image forming apparatus. Japanese Patent No. 6350474 describes capturing an image on a sheet using an image capturing apparatus such as a digital camera or a camera-equipped cell phone, and calibrating the image forming apparatus based on a result of the capture.

According to the invention of Japanese Patent No. 5164458, an image forming apparatus lacking an image sensor cannot identify the components that cause image deficiencies. In this case, a user must purchase an image forming apparatus equipped with an image sensor. The invention of Japanese Patent No. 6350474 cannot detect image deficiencies in the first place, nor can it identify components that cause image deficiencies.

SUMMARY OF THE INVENTION

The disclosure provides a diagnostic system comprising: an image forming apparatus that forms a diagnostic image on a sheet; and an image capturing apparatus that captures an image of the sheet on which the diagnostic image is formed and which has been discharged from the image forming apparatus, and outputs the image captured as a sheet image, wherein the image capturing apparatus comprises one or more processor configured to: make a diagnosis for a component of the image forming apparatus based on a position of an image deficiency in the sheet image; and output a diagnosis result for the component of the image forming apparatus.

Further features of the present invention will become apparent from the following description of exemplary embodiments (with reference to the attached drawings).

BRIEF DESCRIPTION OF THE DRAWINGS

FIG. 5 is a flowchart illustrating an image diagnosis method.
FIG. 8 is a diagram illustrating an image diagnosis method that uses a plurality of sheets.
FIGS. 18A and 18B are flowcharts illustrating an image diagnosis method and the like.
FIG. 21 is a diagram illustrating an effect of an embodiment.
FIGS. 23A and 23B are flowcharts illustrating another image diagnosis method and the like.
FIGS. 24A and 24B are flowcharts illustrating yet another image diagnosis method and the like.

DESCRIPTION OF THE EMBODIMENTS

Figure 1:
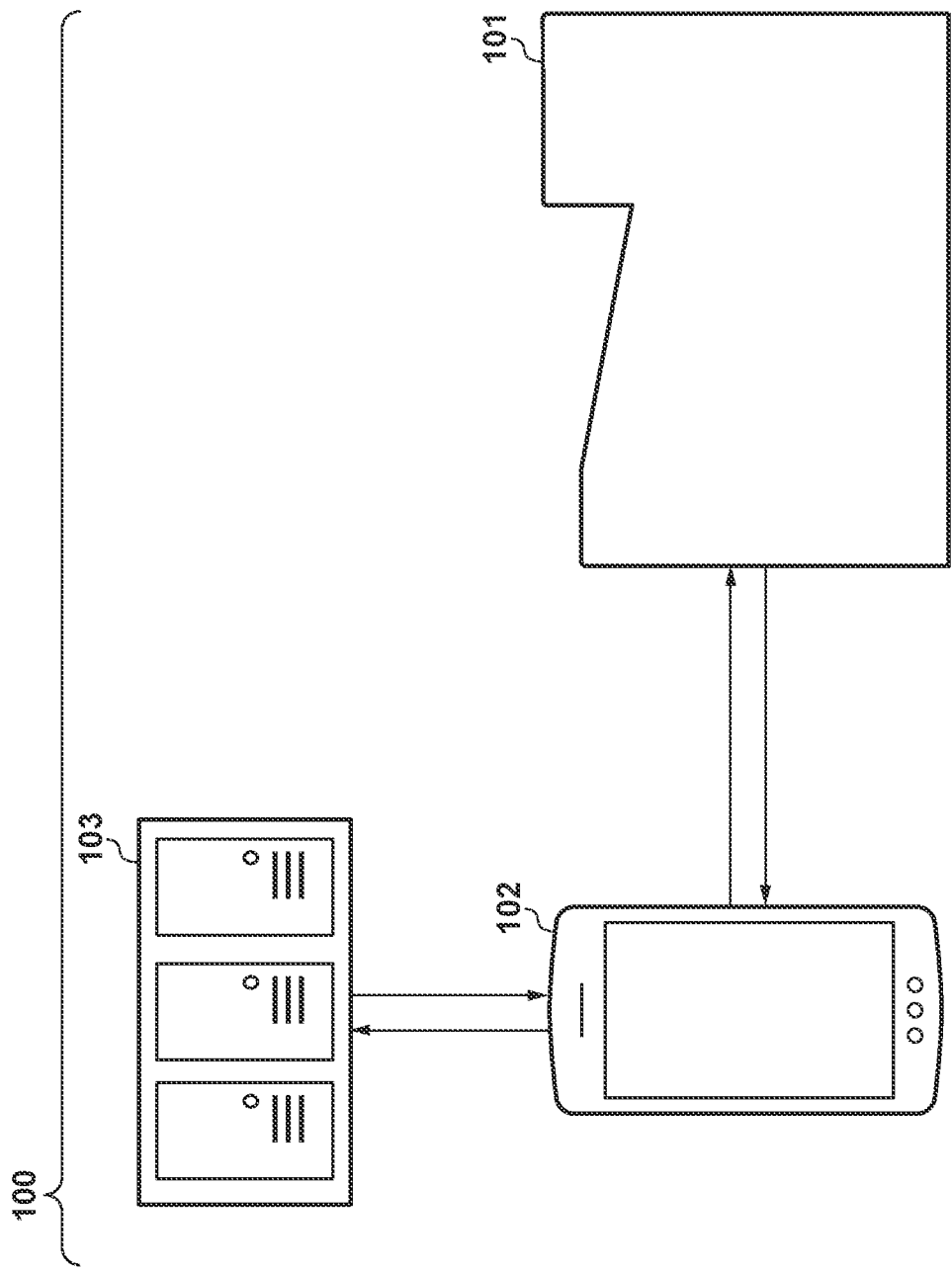
FIG. 1 is a diagram illustrating a diagnostic system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Diagnostic System

As illustrated in FIG. 1, a diagnostic system 100 includes an image forming apparatus 101 for diagnosis and an image capturing apparatus 102. A server 103 is optional. It is assumed here that the image forming apparatus 101 does not have an image sensor that reads a diagnostic image formed on a sheet. However, the image forming apparatus 101 may have an image sensor that reads a diagnostic image formed on a sheet. For example, if a diagnostic function provided by the image capturing apparatus 102 is superior to a diagnostic function provided by the image forming apparatus 101, a user will likely wish to diagnose the image forming apparatus 101 using the diagnostic function of the image capturing apparatus 102.

The image capturing apparatus 102 includes a camera, and is a communication device that can be carried by the user (e.g., a smartphone, a tablet terminal, or a digital camera). Here, the "user" is a human being who can operate the image capturing apparatus 102, and includes owners, users, and maintenance workers of the image forming apparatus 101. The image capturing apparatus 102 includes wireless communication circuitry (e.g., wireless LAN, Bluetooth (registered trademark), or cellular wireless) and wired communication circuitry (e.g., a USB interface), and is capable of communicating with the image forming apparatus 101 and the server 103.

In the first embodiment, the image capturing apparatus 102 functions as a diagnostic apparatus for diagnosing the image forming apparatus 101. Note that the image capturing apparatus 102 may capture a diagnostic image formed on a sheet, generate a sheet image, and transfer the sheet image to the server 103. The server 103 may diagnose the image forming apparatus 101 based on the sheet image. The server 103 may be a personal computer (PC).

Image Capturing Apparatus

Figure 2:
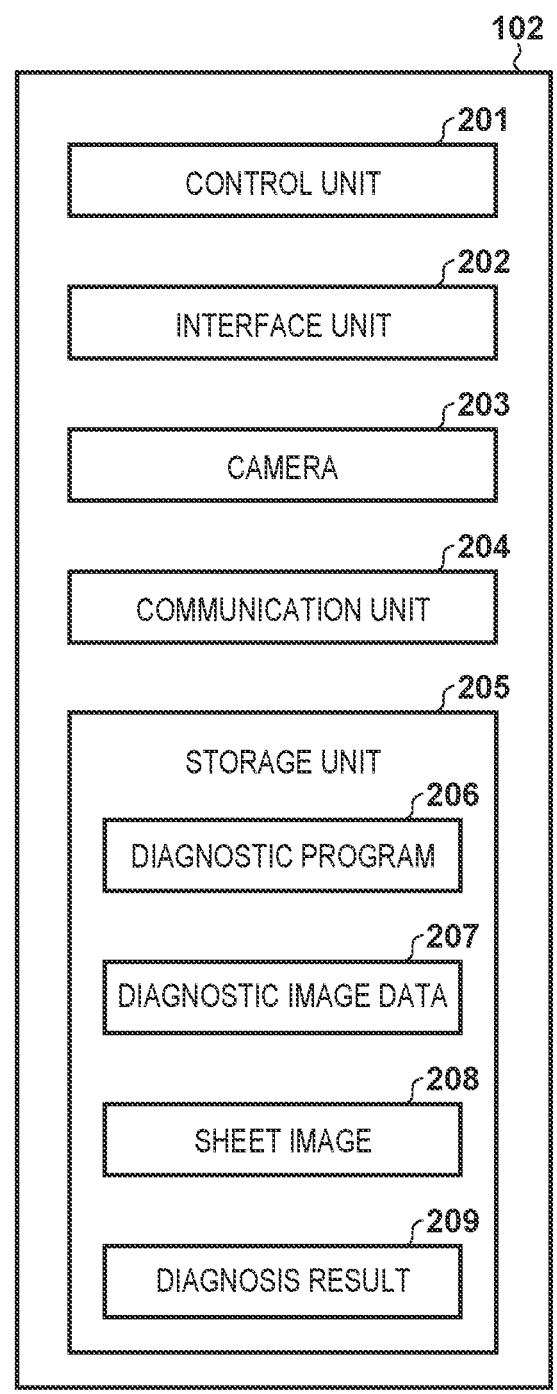
FIG. 2 is a diagram illustrating an image capturing apparatus.

FIG. 2 illustrates the configuration of the image capturing apparatus 102. A control unit 201 controls an interface unit 202, a camera 203, a communication unit 204, and a storage unit 205 according to a control program stored in the storage unit 205. The control unit 201 includes hardware circuitry such as a central processing unit (CPU), an application-specific integrated circuit (ASIC), and a field programmable gate array (FPGA). The interface unit 202 includes an output device (display device) that outputs information to the user and an input device that accepts user inputs (e.g., a touch panel sensor). The camera 203 includes an image sensor (e.g., a CMOS image sensor or a CCD image sensor), a light source that emits illumination light, and the like. The communication unit 204 includes the wireless communication circuitry and the wired communication circuitry mentioned above. The storage unit 205 includes random access memory (RAM), read-only memory (ROM), and the like. The storage unit 205 stores a control program (a diagnostic program 206) executed by the control unit 201 and control data (diagnostic image data 207) in a ROM region. The diagnostic image data 207 is original image data of a diagnostic image formed on a sheet. The storage unit 205 stores a sheet image 208 obtained by the camera 203, a diagnostic result 209, and the like in a RAM region.

Image Forming Apparatus

Figure 3:
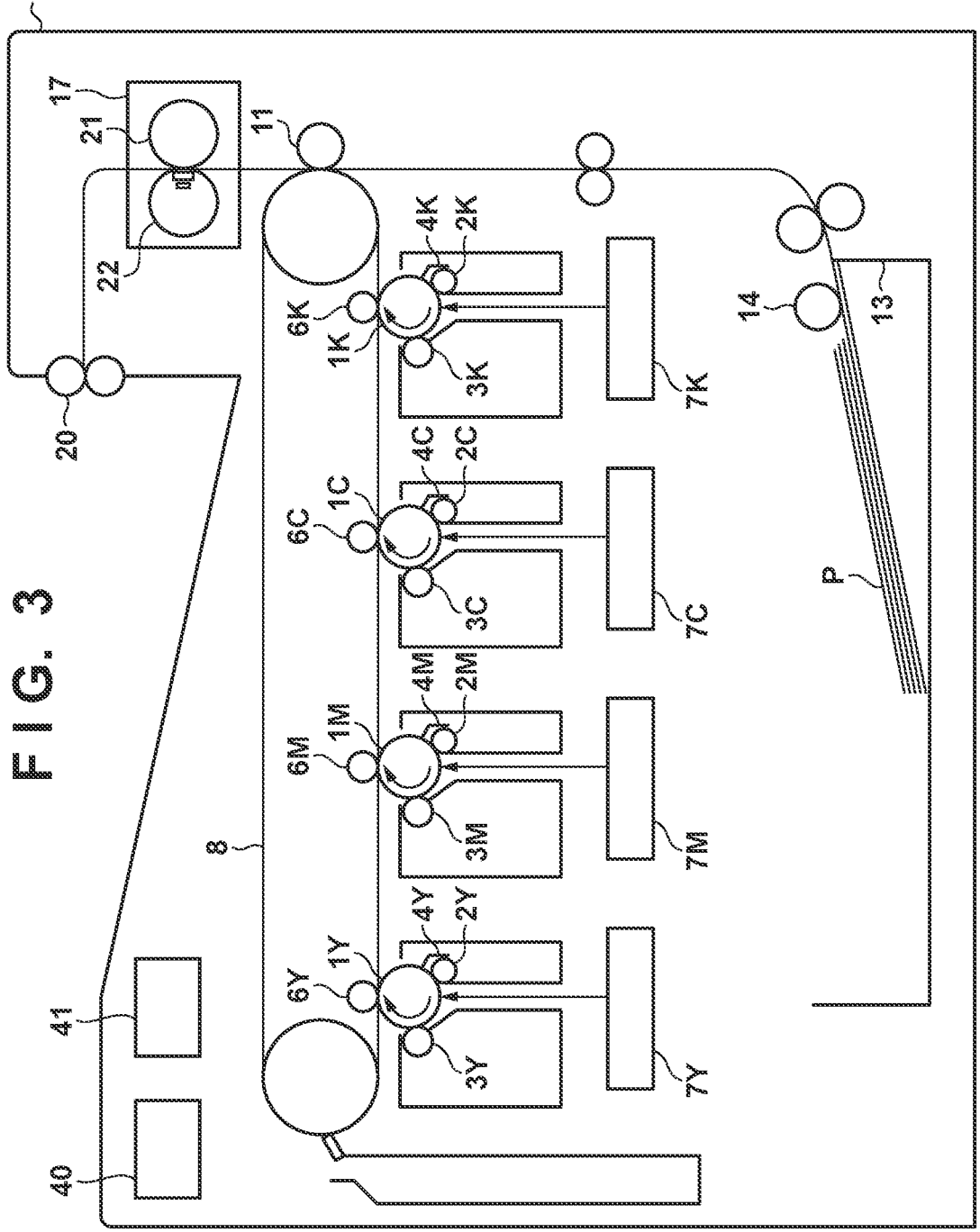
FIG. 3 is a diagram illustrating an image forming apparatus.

Although FIG. 3 illustrates an electrophotographic image forming apparatus 101, the technical spirit of the present embodiment can be applied to any image forming apparatus in which components such as a rotating body are involved in the formation of images. For example, the technical spirit of the present embodiment is applicable to any image forming apparatus in which image deficiencies occur in an image formed on a sheet P due to the components having reached the end of their useful life, components malfunctioning, and the like. The technical spirit of the present embodiment is also applicable in any image forming apparatus in which image deficiencies occur when components which require regular maintenance (e.g., cleaning, tuning, and replacement) have not been given such regular maintenance.

In FIG. 3, the letters Y, M, C, and K appended to the ends of the reference signs indicate toner colors, i.e., yellow, magenta, cyan, and black. For example, components with a Y appended to the end of the reference signs are involved in the formation of a yellow toner image. When there is no need to distinguish among the colors in describing the components, reference signs without the appended letters are used.

A control unit 40 is a control circuit (e.g., a CPU, an ASIC, and an FPGA) that controls the various parts of the image forming apparatus 101. The control unit 40 receives image data and printing instructions from an external device (e.g., the image capturing apparatus 102) through a communication unit 41. The control unit 40 converts the image data to generate an image signal, and supplies the image signal to an exposure device 7.

A photosensitive member 1 is an image carrier that is driven by a drive source such as a motor and rotates clockwise, and carries an electrostatic latent image and a toner image. The photosensitive member 1 is sometimes called a photosensitive drum due to being a cylindrical rotating body. A charging roller 2 is applied with a charging bias voltage by the control unit 40 and charges the surface of the photosensitive member 1 to a uniform potential. The exposure device 7 forms an electrostatic latent image on the surface (circumferential surface) of the photosensitive member 1 by irradiating the surface of the photosensitive member 1 with laser light corresponding to the image signal. A developing roller 3 is applied with a developing bias voltage by the control unit 40, and forms a toner image on the surface of the photosensitive member 1 by causing toner to adhere to the electrostatic latent image. The primary transfer roller 6 is applied with a primary transfer bias voltage by the control unit 40, and transfers the toner image from the photosensitive member 1 to an intermediate transfer belt 8. A cleaner 4 is a cleaning member that removes and collects toner that has not been transferred to the intermediate transfer belt 8 and remains on the photosensitive member 1. The photosensitive member 1, the developing roller 3, the charging roller 2, and the cleaner 4 may be integrated within a cartridge. Such a cartridge is configured to be removable from the main body of the image forming apparatus 101. The photosensitive member 1, the charging roller 2, the exposure device 7, the developing roller 3, and the primary transfer roller 6 function as an image forming unit that forms an image on the intermediate transfer belt 8.

The intermediate transfer belt 8 is an endless belt, and is sometimes referred to as an intermediate transfer body. The intermediate transfer belt 8 is driven by a drive source such as a motor, and rotates counterclockwise. Toner images from each of the four photosensitive members 1 are superimposed and transferred onto the intermediate transfer belt 8, and a full-color toner image is formed on the intermediate transfer belt 8 as a result. The toner image transferred onto the intermediate transfer belt 8 is conveyed to a secondary transfer section. The secondary transfer section is a nip section formed by the intermediate transfer belt 8 and a secondary transfer roller 11.

A sheet cassette 13 is a holding unit that holds a large number of sheets P. A feed roller 14 feeds the sheet P from the cassette 13 to a conveyance path 15 according to instructions from the control unit 40. The sheet P is conveyed to the secondary transfer section by conveyance rollers provided along the conveyance path 15. The secondary transfer roller 11 is applied with a secondary transfer bias voltage by the control unit 40, and transfers the toner image from the intermediate transfer belt 8 onto the sheet P. The secondary transfer roller 11 conveys the sheet P to a fixer 17. The fixer 17 includes two rotating bodies (a fixing roller 22 and a pressure roller 21), and fixes the toner image onto the sheet P by applying heat and pressure to the sheet P and the toner image. As the fixing roller 22 and the pressure roller 21 rotate, the sheet P is conveyed to a discharge roller 20. The discharge roller 20 discharges the sheet P to the exterior of the image forming apparatus 101.

Control Unit of Server

Figure 4A:
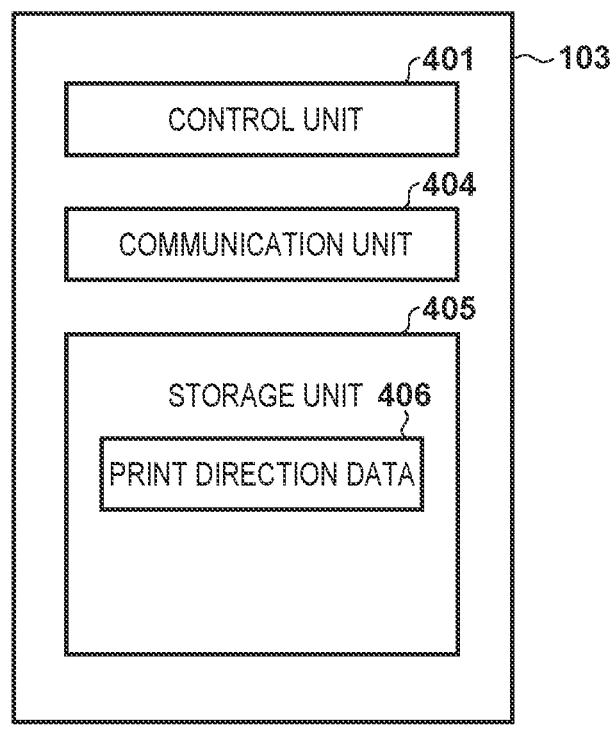
FIGS. 4A and 4B are diagrams illustrating a server and a control unit of the image forming apparatus.

As illustrated in FIG. 4A, the server 103 includes a control unit 401, a communication unit 404, and a storage unit 405.

The control unit 401 includes a CPU and the like that execute a control program stored in the storage unit 405. The communication unit 404 is communication circuitry that communicates with the image capturing apparatus 102 over the network 130. The storage unit 405 includes ROM, RAM, a solid state drive (SSD), and a hard disk drive (HDD). The storage unit 405 stores, for example, print direction data 406 that holds model information of the image forming apparatus 101 and a standard print direction thereof in association with each other. Upon receiving a query from the image capturing apparatus 102 including the model information of the image forming apparatus 101, the control unit 401 reads out the print direction corresponding to the model information from the print direction data 406 and responds by sending information indicating the print direction (print direction information) to the image capturing apparatus 102. The print direction refers to the orientation of the image relative to the sheet P. For example, a forward direction, in which the upper side of the image (the header side) is located on the leading edge side of the sheet P in a conveyance direction of the sheet P, and a reverse direction, in which the lower side of the image (the footer side) is located on the leading edge side of the sheet P in the conveyance direction of the sheet P, can be given as print directions. Even if the standard print direction is the forward direction, reverse direction printing can be achieved by a printer driver rotating the print direction 180 degrees.

Incidentally, when a rotating body such as the photosensitive member 1 reaches a replacement time (lifespan), image deficiencies may occur on the sheet P at intervals corresponding to the rotation cycle of the photosensitive member 1. Similarly, when the developing roller 3 approaches its replacement time, image deficiencies occur on the sheet P at an interval based on the rotation cycle of the developing roller 3. The same applies to the charging roller 2, the intermediate transfer belt 8, the fixing roller 22, the pressure roller 21, and the like. The image capturing apparatus 102 measures a distance from a reference position (e.g., a leading edge of the sheet, a test pattern, the position of another image deficiency) within the sheet image generated by capturing an image of the diagnostic image to the position of an image deficiency. Based on a measurement result, the image capturing apparatus 102 can identify which component requires maintenance. In other words, the image capturing apparatus 102 identifies the component that is the cause of the image deficiency and notifies the user.

Here, to accurately make an image diagnosis, it is necessary for the image capturing apparatus 102 to ascertain whether an upper side of the diagnostic image corresponds to a leading edge side or a following edge side of the sheet P in the conveyance direction of the sheet P. As mentioned above, the image forming apparatus 101 has a forward direction and a reverse direction as print directions. Some image forming apparatuses 101 may take the forward direction as the standard print direction, whereas some image forming apparatuses 101 may take the reverse direction as the standard print direction. The image capturing apparatus 102 generates the sheet image by capturing an image of the diagnostic image formed on the sheet P. However, it is difficult for the image capturing apparatus 102 to determine, from the sheet image, whether the diagnostic image was printed in the forward direction with respect to the sheet P or printed in the reverse direction with respect to the sheet P. It is therefore important for the image capturing apparatus 102 that makes the image diagnosis to obtain the print direction of the diagnostic image. For example, the image capturing apparatus 102 obtains the print direction of the image forming apparatus 101 from the server 103 by transmitting model information of the image forming apparatus 101 to the server 103.

Control Unit of Image Forming Apparatus

Figure 4B:
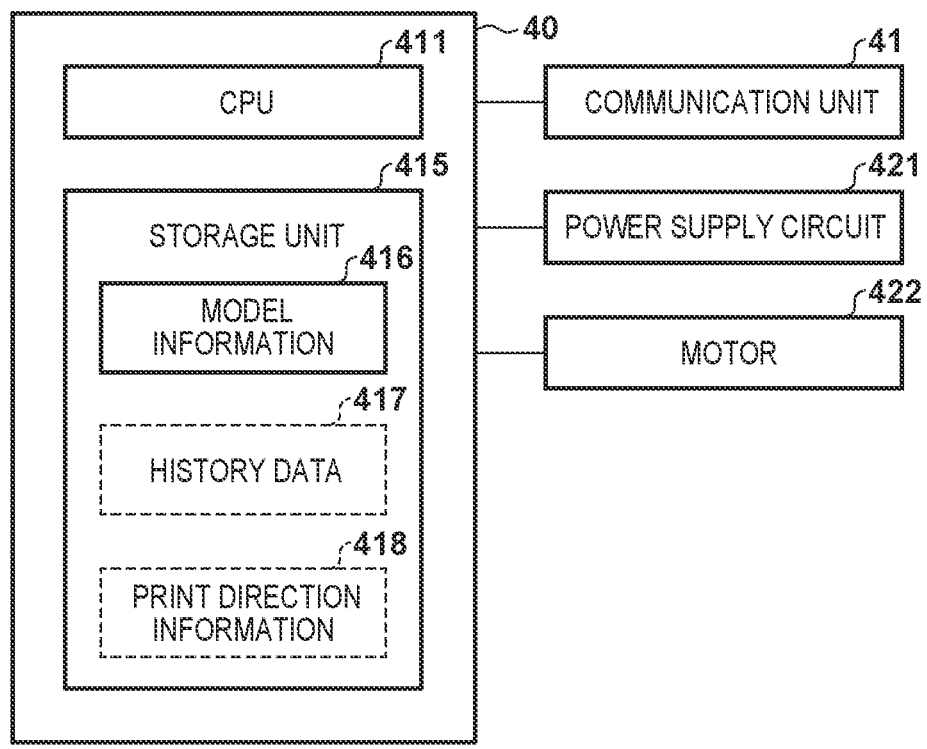

FIG. 4B illustrates the control unit 40 of the image forming apparatus 101. A CPU 411 controls each unit of the image forming apparatus 101 by executing a control program stored in a storage unit 415. For example, upon receiving a printing instruction for the diagnostic image from the image capturing apparatus 102, the CPU 411 controls the image forming apparatus 101 to form the diagnostic image on the sheet P. At this time, the CPU 411 controls a power supply circuit 421 to generate the charging bias voltage, the developing bias voltage, and the transfer bias voltages. Additionally, the CPU 411 rotates the various types of rotating bodies, such as the photosensitive member 1, by driving a motor 422. The storage unit 415 includes RAM, ROM, an SSD, an HDD, and the like. The storage unit 415 stores model information 416, which is identification information of the image forming apparatus 101. The CPU 411 may store information indicating a usage history of the image forming apparatus 101 (e.g., a cumulative number of images formed) or the replacement time of each component in the storage unit 415 as history data 417. The storage unit 415 may store print direction information 418 indicating the standard print direction of the image forming apparatus 101. In this case, the image capturing apparatus 102 can obtain the print direction information 418 from the image forming apparatus 101. Note that the "standard print direction" is the default print direction defined by the design of the image forming apparatus 101. The user can specify, through a printer driver of the image forming apparatus 101, that the printing orientation of the image be rotated by 180 degrees with respect to the standard print direction.

Flowcharts

FIG. 5 illustrates an image diagnosis method executed by a CPU provided in the control unit 201, according to the diagnostic program 206. When the control unit 201 is instructed to launch the diagnostic program 206 through the interface unit 202, the control unit 201 launches the diagnostic program 206 and executes the following processing.

In step S501, the control unit 201 obtains the model information 416 of the image forming apparatus 101. For example, the control unit 201 connects to the image forming apparatus 101 through the communication unit 204 and transmits a request to the image forming apparatus 101. As a result, the control unit 201 receives the model information 416 from the image forming apparatus 101 through the communication unit 204. The model information 416 includes identification information such as a product number, a model name, and the like of the image forming apparatus 101.

In step S502, the control unit 201 obtains the print direction information of the image forming apparatus 101. For example, the control unit 201 connects to the server 103 through the communication unit 204 and transmits a query for the print direction information. The query includes the model information 416. The control unit 201 obtains the print direction information 418 corresponding to the model information 416 from the server 103 through the communication unit 204.

In step S503, the control unit 201 sets the print direction of the diagnostic image based on the print direction information 418.

Figure 6A:
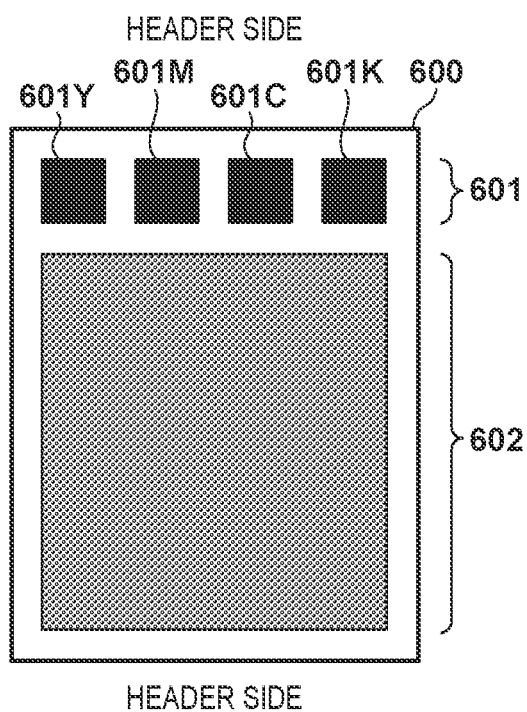
FIGS. 6A to 6C are diagrams illustrating a diagnostic image and a sheet image.

FIG. 6A illustrates an example of the diagnostic image 600. The diagnostic image 600 includes a single-color pattern 601 and a halftone pattern 602. The single-color pattern 601 includes a test image formed from one color among Y, M, C, and K. The halftone pattern 602 includes a gradation image formed by mixing all of the Y, M, C, and K colors. The control unit 201 specifies the print direction of the image forming apparatus 101, based on the standard print direction of the image forming apparatus 101 indicated by the print direction information 418, such that the header side of the diagnostic image 600 is formed on the leading edge side of the sheet P in the conveyance direction of the sheet P. For example, if the standard print direction is the forward direction, the control unit 201 sets a rotation angle of the orientation of the image to 0 degrees. If the standard print direction is the reverse direction, the control unit 201 sets the rotation angle of the orientation of the image to 180 degrees. As a result, the single-color pattern 601 of the diagnostic image 600 is formed on the leading edge side of the sheet P. Note that the leading edge of the sheet P passes through the secondary transfer section before the following edge of the sheet P.

In step S504, the control unit 201 transmits, to the image forming apparatus 101, a printing instruction to print the diagnostic image 600. The printing instruction includes the diagnostic image data 207, which serves as the source of the diagnostic image 600, and designation information of the print direction (printing orientation) set in step S503.

In step S505, the control unit 201 controls the camera 203 to capture (photograph) the diagnostic image formed on the sheet P by the image forming apparatus 101 and generate a sheet image. For example, the control unit 201 may display a guidance message prompting the user to capture the diagnostic image 600 in the display device of the interface unit 202. The user then operates the input device of the interface unit 202 in response to the guidance and captures the diagnostic image 600 on the sheet P. As a result, the sheet image 208 is generated and saved in a RAM region of the storage unit 205.

Figure 6B:
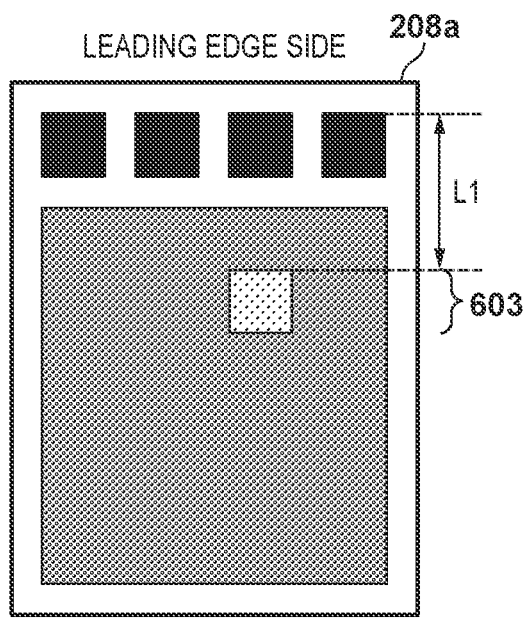

FIG. 6B illustrates a sheet image 208a showing drum ghosting. From FIG. 6B, it can be seen that the leading edge side of the sheet P and the header side of the diagnostic image 600 do not match. Here, the single-color pattern 601 is an image pattern useful for sensing an image deficiency known as "drum ghosting". "Drum ghosting" is an image deficiency that can occur due to deterioration of the photosensitive member 1. As illustrated in FIG. 6B, the single-color pattern 601 formed first appears as an afterimage 603. Here, a distance L1 between the single-color pattern 601 and the afterimage 603 corresponds to the circumferential length of the photosensitive member 1. The density of the afterimage 603 differs from the density of the regular halftone pattern 602. The control unit 201 can determine the presence or absence of drum ghosting by comparing the image density at a position distanced from the single-color pattern 601 by the distance L1 with a reference density (the density of the halftone pattern 602).

In this manner, it is important for the single-color pattern 601 to be printed on the sheet P before the halftone pattern 602. If the print direction is incorrect, the single-color pattern 601 will be formed after the halftone pattern 602, and thus the afterimage 603 of the single-color pattern 601 does not arise in the halftone pattern 602. In other words, the control unit 201 will not be able to correctly diagnose the deterioration of the photosensitive member 1. The halftone pattern 602 is an image pattern mainly used to sense the occurrence of defects caused by the transport of the sheet P. Due to wear from years of use, drive gears, conveyance rollers, and the like may deteriorate or break. Image deficiencies 604a to 604c occur in the halftone pattern 602 of a sheet image 208b illustrated in FIG. 6C. An interval L2 between the image deficiencies 604a to 604c is equivalent to the circumferential length of the drive gear or conveyance roller, and thus the control unit 201 can identify the drive gear or conveyance roller as defective.

In step S506, the control unit 201 analyzes the sheet image 208 and senses an image deficiency. For example, the control unit 201 determines whether the afterimage 603 occurs at a position distanced from the single-color pattern 601 by the distance L1. Alternatively, the control unit 201 may sense the afterimage 603, identify the position where the afterimage 603 occurs, and determine whether the distance between the single-color pattern 601 and the afterimage 603 is the distance L1. Alternatively, the control unit 201 may sense a plurality of the image deficiencies 604a to 604c that occur periodically and measure the interval L2 between each of the plurality of image deficiencies 604a to 604c. The distance L1 and the interval L2 are values that correlate to the rotation cycle (circumferential length) of the rotating body that causes the image deficiency, and the rotating body that causes the image deficiency can therefore be identified.

In step S507, the control unit 201 generates a diagnosis result. The control unit 201 identifies the component (a causative component) constituting the image forming apparatus 101 based on the position of the image deficiency. The control unit 201 generates the diagnosis result, which indicates the installation location of the causative component within the image forming apparatus 101, the wear state of the causative component, the replacement time of the causative component, an ordering method of the causative component, and the like. The diagnosis result may include state information for each of the plurality of components, indicating whether the state is a normal state or a state in which maintenance is required. The diagnosis result may include information indicating measures for reducing image deficiencies (e.g., replacement, repair, cleaning, or the like). If no image deficiencies are sensed in step S506, the diagnosis result includes information indicating that all components constituting the image forming apparatus 101 are operating normally.

In step S508, the control unit 201 displays the diagnosis result in the display device of the interface unit 202. The control unit 201 may notify an administrator or maintenance worker of the diagnosis result by outputting (transmitting) the diagnosis result to the server 103, the image forming apparatus 101, or a personal computer through the communication unit 204.

Figure 7A:
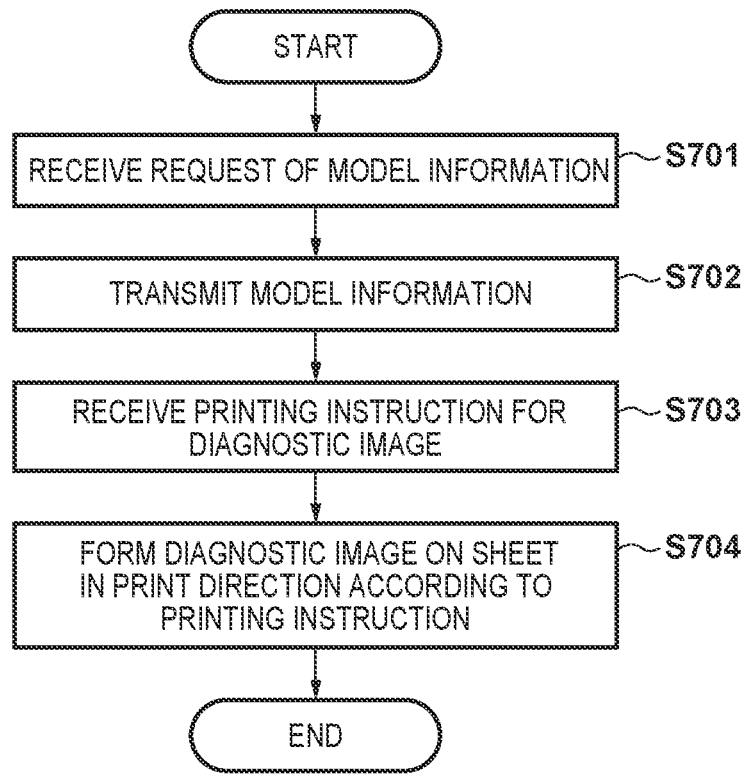
FIGS. 7A and 7B are flowcharts illustrating processing by the server and processing by the image forming apparatus.

FIG. 7A illustrates a model information providing method executed by the CPU 411 of the image forming apparatus 101. In step S701, the CPU 411 receives a request (a transmission request) for the model information 416 from the image capturing apparatus 102. In step S702, the CPU 411 reads out the model information 416 from the storage unit 415 and transmits the model information 416 to the image capturing apparatus 102 through the communication unit 41.

In step S703, the CPU 411 receives a printing instruction for the diagnostic image 600 from the image capturing apparatus 102 through the communication unit 41. In step S704, the CPU 411 forms the diagnostic image 600 on the sheet P in the print direction according to the printing instruction.

Figure 7B:
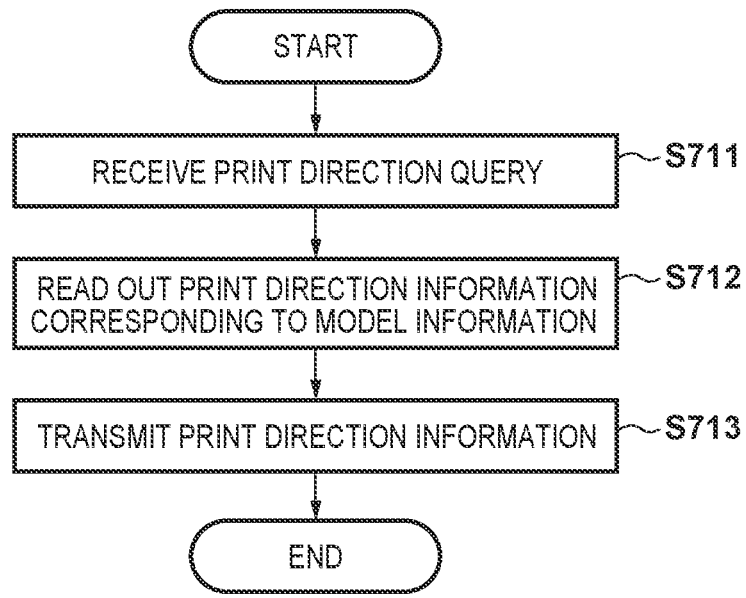

FIG. 7B illustrates a print direction information providing method executed by the CPU 411 of the server 103. In step S711, the CPU 411 receives a print direction query from the image capturing apparatus 102 through the communication unit 404. In step S712, the CPU 411 searches and reads out, from the print direction data 406, the print direction information corresponding to the model information included in the query. In step S713, the CPU 411 sends the print direction information to the image capturing apparatus 102 through the communication unit 404.

According to the present embodiment, the diagnostic system 100 can diagnose components of the image forming apparatus 101 using the image capturing apparatus 102, such as a smartphone, regardless of the model of the image forming apparatus 101. Accordingly, even if the image forming apparatus 101 is not equipped with a diagnostic image sensor, the user will still be able to obtain a diagnosis result. Note, however, that the image capturing apparatus 102 may perform a similar diagnosis for an image forming apparatus 101 equipped with an image sensor.

According to the present embodiment, the leading edge side of the sheet P matches the header side of the diagnostic image 600, and thus a more accurate diagnosis result can be obtained. In other words, the component that is the cause of the image deficiency can be identified accurately.

Because the leading edge side of the sheet P matches the header side of the diagnostic image 600, the image capturing apparatus 102 can identify the printing orientation of the diagnostic image from the sheet image 208. In other words, the image capturing apparatus 102 can identify the one of the four sides constituting sheet image 208 that first passed through the secondary transfer section (a diagnostic reference side). For example, the image capturing apparatus 102 may measure the distance from the identified diagnostic reference side to the position of the image deficiency and identify the component that is the cause of the image deficiency based on the measured distance.

Figure 6C:
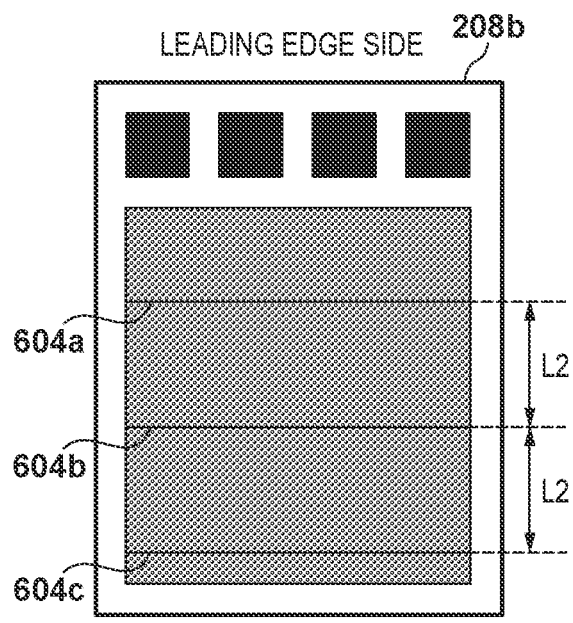

In FIGS. 6B and 6C, the diagnosis is made using single sheet images 208a and 208b, but this is only one example. The number of sheets P on which the diagnostic image 600 is printed may be determined according to the size of the constituent members (components) of the image forming apparatus 101 to be diagnosed. For example, a plurality of sheets P are needed to sense image deficiencies caused by scratches on the surface of the intermediate transfer belt 8. This is because a circumferential length L3 of the intermediate transfer belt 8 is much longer than a length Lp of the sheet P in the conveyance direction of the sheets P. Therefore, the diagnostic image 600 may be formed continuously for N sheets P corresponding to a length at least one or two times the circumferential length L3.

FIG. 8 illustrates the relationship between the circumferential length L3 of the intermediate transfer belt 8 and three sheets Pa, Pb, and Pc on which the diagnostic image 600 is formed. The diagnostic image 600 is formed on the first sheet Pa. Only the halftone pattern 602 of the diagnostic image 600 is formed on the second sheet Pb. Only the halftone pattern 602 of the diagnostic image 600 is formed on the third sheet Pc. In addition, identification patterns 801a, 801b, and 801c, which indicate the page number and the printing orientation, are printed on the header side of each of the sheets Pa, Pb, and Pc. The image capturing apparatus 102 senses image deficiencies and measures the distances with respect to the positions of the image deficiencies. In particular, image deficiencies 802a and 802b caused by the intermediate transfer belt 8 occur periodically at intervals corresponding to the circumferential length L3. Therefore, the image capturing apparatus 102 identifies the sequence of the three sheet images based on the identification patterns 801a, 801b, and 801c, and measures the distance from the diagnostic reference side to the position of the image deficiency according to the identified sequence. In this manner, the sequence of the three sheet images can be identified, and thus distances can be measured across a plurality of sheet images. For example, assume that the distance from the reference side of the sheet Pa to the position of the image deficiency 802a is La, and the distance from the reference side of the sheet Pb to the position of the image deficiency 802b is Lb. The length of each sheet P and a sheet spacing d are known. In this case, the interval L3 is Lp−La+d+Lb.

Incidentally, in step S502, the image capturing apparatus 102 may obtain the print direction information and the circumferential length L3 of the intermediate transfer belt 8 from the server 103. The storage unit 405 of the server 103 stores the circumferential length L3 associated with the model information of the image forming apparatus 101. The server 103 may transmit the print direction information and circumferential length L3 to the image capturing apparatus 102 in response to a query from the image capturing apparatus 102. The control unit 201 determines the number N of the sheets P based on the circumferential length L3. For example, N is determined so that a length Lp×N of the sheets P stored in the cassette 13 is at least L3 or 2×L3. As illustrated in FIG. 8, the distance between the preceding sheet P and the following sheet P (the sheet spacing d) may be taken into account as well. In this case, N is determined so that Lp×N+d(N−1) is at least L3 or 2×L3.

The storage unit 205 of the image capturing apparatus 102 may store a plurality of instances of the diagnostic image data 207. Each of the plurality of instances of the diagnostic image data 207 may be prepared according to the usage history of the image forming apparatus 101 or the durability state of various consumables. The control unit 201 may obtain the history data 417 from the image forming apparatus 101 and determine, based on the history data 417, whether any of the plurality of consumable parts have been used beyond their design lifespan. The control unit 201 selects the diagnostic image data 207 suitable for diagnosing consumable parts that have been used beyond their design lifespan. If there are no consumable parts that have been used beyond their design lifespan, the control unit 201 may select the diagnostic image data 207 suitable for diagnosing consumable parts that are close to their design lifespan. For example, if one or more of the photosensitive members 1Y, 1M, 1C, and 1K have reached the end of their design lifespan, the diagnostic image 600 illustrated in FIG. 6A is selected. This makes it possible to accurately sense defects caused by deterioration in the durability of the photosensitive member 1.

If the fixer 17 continues to be used beyond its design lifespan, the surface of the fixing roller 22 or pressure roller 21 will become scratched or worn. As a result, the toner adhering to the scratches is transferred onto the sheet P in an offset position.

Figure 9A:
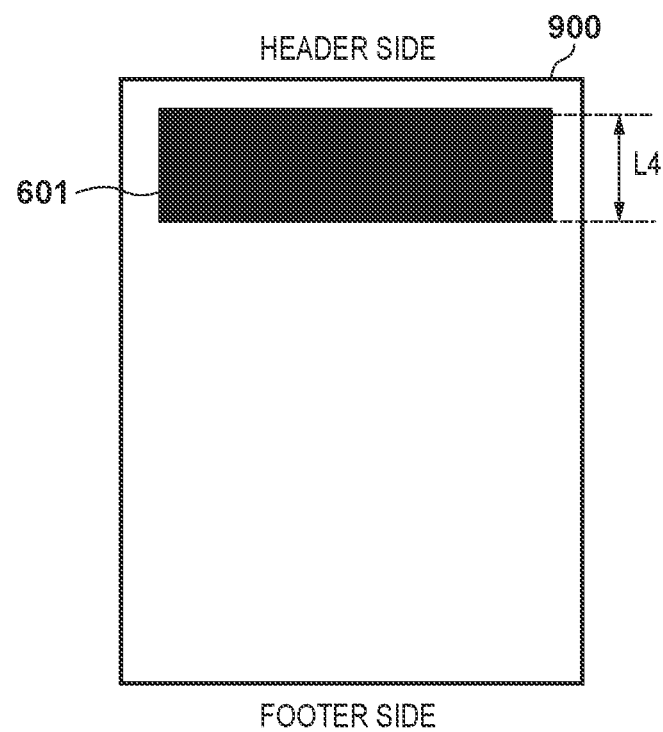
FIGS. 9A and 9B are diagrams illustrating an image diagnosis method related to a fixer.
Figure 9B:
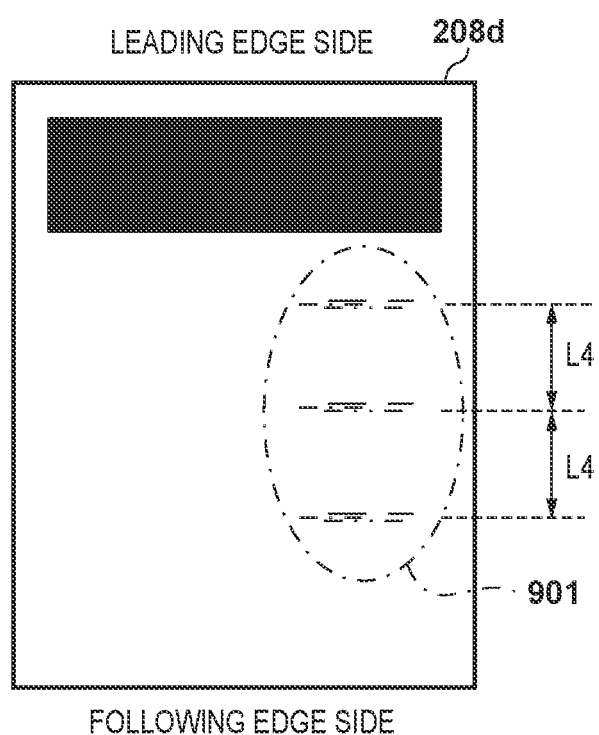

FIG. 9A illustrates a diagnostic image 900 suitable for when the fixer 17 has exceeded its design lifespan. FIG. 9B illustrates a sheet image 208d obtained by capturing an image of a sheet P on which the diagnostic image 900 has been formed, using the image capturing apparatus 102. L4 is the circumferential length of the fixing roller 22 or the pressure roller 21. FIG. 9B indicates that toner adhering to scratches during the fixing of the single-color pattern 601 results in image deficiencies 901. Because the interval between the positions where the image deficiencies 901 occur corresponds to the circumferential length L4, the image capturing apparatus 102 can identify the fixer 17 as the causative component or causative member of the image deficiencies 901.

There are also cases where a plurality of consumable parts are used beyond their design lifespan. In this case, the control unit 201 may identify the most deteriorated consumable and select the diagnostic images corresponding to the identified consumable. Alternatively, a plurality of diagnostic images, respectively corresponding to a plurality of consumables that have been used beyond their design lifespan, may be selected in sequence. This enables more accurate diagnoses to be made for a plurality of consumables that have been used beyond their design lifespans.

In the foregoing descriptions, the image capturing apparatus 102 obtains the print direction information from the server 103, but this is only one example. The storage unit 205 of the image capturing apparatus 102 may store the print direction data 406. In this case, the control unit 201 can obtain the print direction information corresponding to the model information of the image forming apparatus 101 from the print direction data 406 in the storage unit 205. Alternatively, the image capturing apparatus 102 may obtain the print direction information 418 from the image forming apparatus 101. For example, the control unit 201 transmits, to the image forming apparatus 101, a transmission request for the print direction information 418 along with the model information 416. Upon receiving this request, the CPU 411 reads the model information 416 and the print direction information 418 from the storage unit 415 and transmits this information to the image capturing apparatus 102. In this case, the image capturing apparatus 102 does not need to communicate with the server 103. In other words, the image capturing apparatus 102 can omit the network environment for communicating with the server 103.

In the foregoing descriptions, the image capturing apparatus 102 obtains the model information 416 from the image forming apparatus 101, but this is only one example. For example, the image capturing apparatus 102 may obtain the product number, the model name, and the like, which are model information, from user inputs made through the interface unit 202. In this case, the processing for obtaining the model information becomes unnecessary. Similarly, the control unit 201 may obtain the print direction information from user inputs through the interface unit 202. In this case, the processing for obtaining the print direction information from the server 103 or the image forming apparatus 101 is also unnecessary. Accordingly, the user can shorten the time required from the start of the diagnosis to the end of the diagnosis.

Figure 10A:
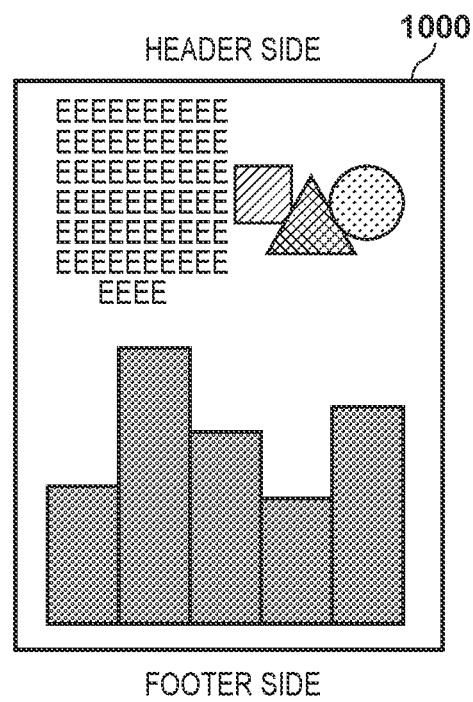
FIGS. 10A and 10B are diagrams illustrating an image diagnosis method using a given image.
Figure 10B:
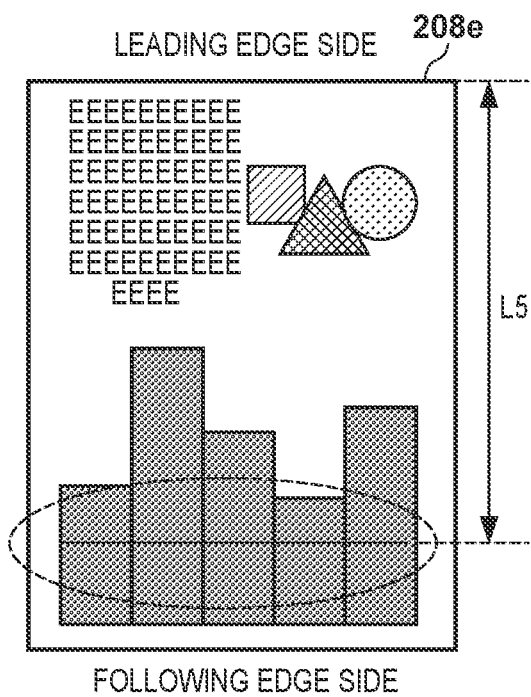

In the foregoing descriptions, dedicated diagnostic images 600 and 900 that include test patterns are used, but this is only one example. The diagnostic image may be any image prepared by a user. Such a diagnostic image may also be marked with an identification pattern that makes it possible to identify the print direction and the page number. FIG. 10A illustrates a given diagnostic image 1000 prepared by the user. FIG. 10B illustrates a sheet image 208e obtained by capturing an image of the diagnostic image 1000 formed on the sheet P using the image capturing apparatus 102. In this case, the control unit 201 compares the diagnostic image 1000 with the sheet image 208e and detects a difference. Because the difference corresponds to an image deficiency, the control unit 201 measures a distance L5 from the diagnostic reference side in the sheet image 208e to the position of the difference, and identifies the component corresponding to the distance L5. Specific examples of the differences are a difference in image density, irregular toner adhesion to white areas (e.g., horizontal streaking), and the like.

Second Embodiment

In the first embodiment, the print direction of the image forming apparatus 101 is obtained from the server 103, the image forming apparatus 101, or the user. The second embodiment will describe a method of identifying the print direction of the image forming apparatus 101 using a direction determination image for determining the print direction.

Figure 11A:
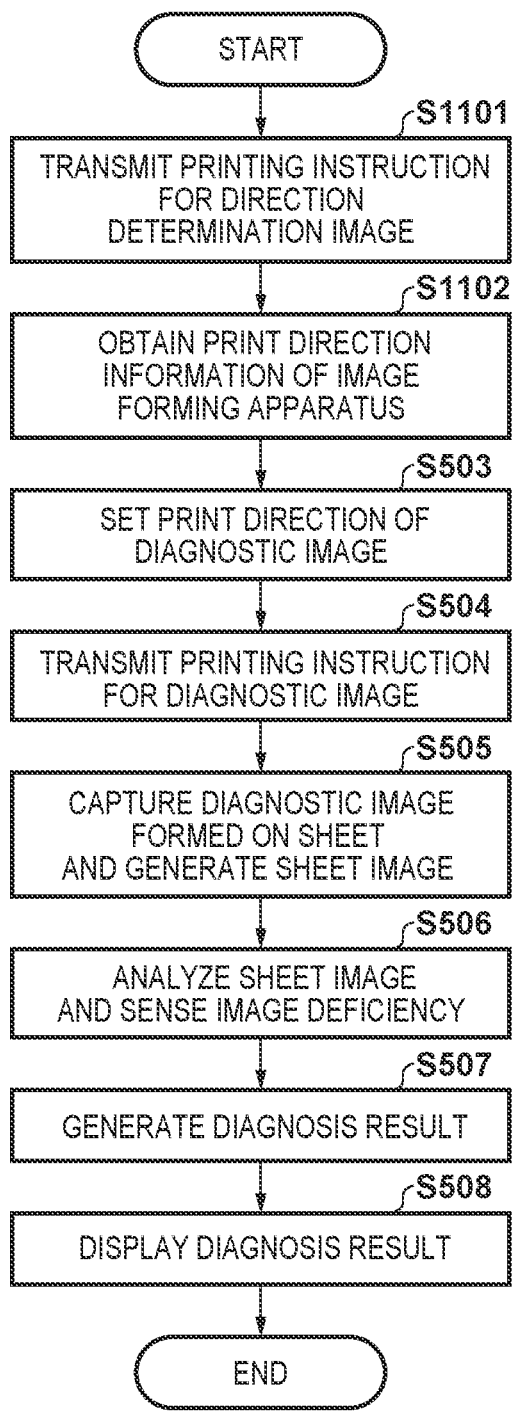
FIGS. 11A and 11B are flowcharts illustrating an image diagnosis method.

FIG. 11A is a flowchart illustrating an image diagnosis method executed by the control unit 201. The control unit 201 launches the diagnostic program 206 according to a launch instruction of the diagnostic program 206 input from the interface unit 202. Note that in the second embodiment, processes that are the same as in the first embodiment will be given the same reference signs, and will not be described.

Figure 12A:
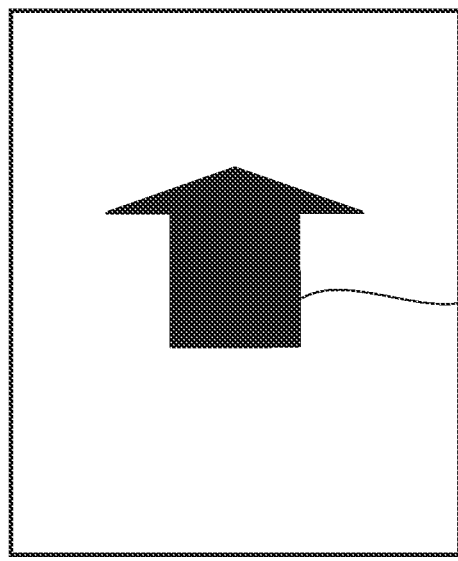
FIGS. 12A to 12C are diagrams illustrating user input of a print direction using a direction determination image.

As illustrated in FIG. 11A, in step S1101, the control unit 201 transmits a printing instruction for the direction determination image to the image forming apparatus 101. FIG. 12A illustrates a direction determination image 1200. The direction determination image 1200 is an image that includes an image pattern 1201 formed to be vertically asymmetrical with respect to the conveyance direction of the sheet P in the image forming apparatus 101. The image data of the direction determination image 1200 is stored in the storage unit 205 and transmitted to the image forming apparatus 101 along with the printing instruction.

Figure 11B:
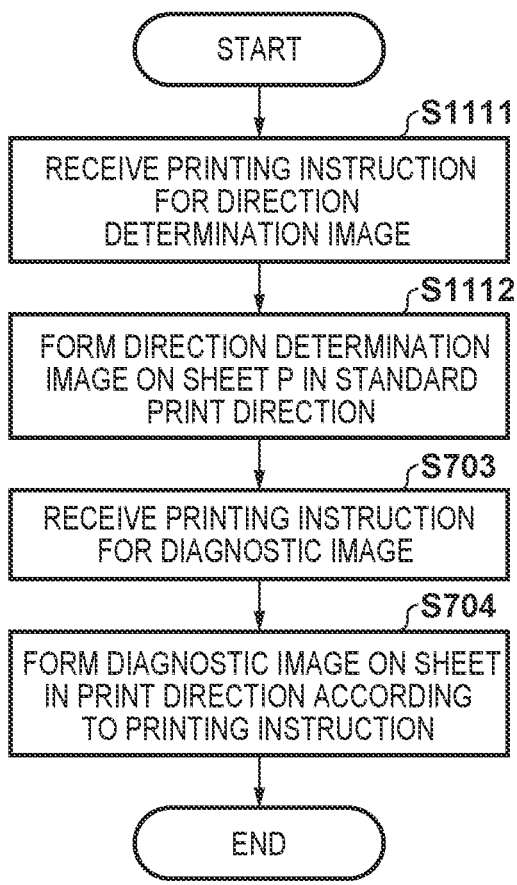
Figure 12B:
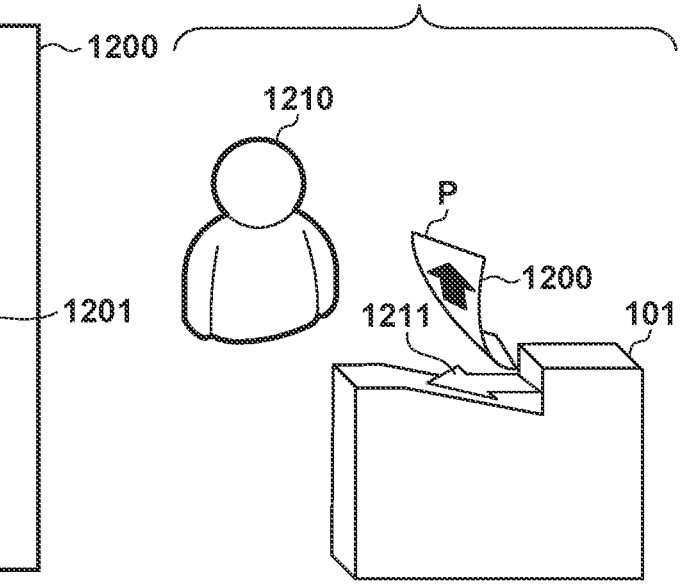

As illustrated in FIG. 11B, the CPU 411 of the image forming apparatus 101 receives the printing instruction and the image data of the direction determination image 1200 from the image capturing apparatus 102 in step S1111. In step S1112, the CPU 411 controls the image forming apparatus 101 to form the direction determination image 1200 on the sheet P in the standard print direction. As illustrated in FIG. 12B, the sheet P on which the direction determination image 1200 is formed is discharged in the discharge direction indicated by arrow 1211. At this time, a user 1210 observes the discharge direction of the sheet P and the orientation of the direction determination image 1200.

Figure 12C:
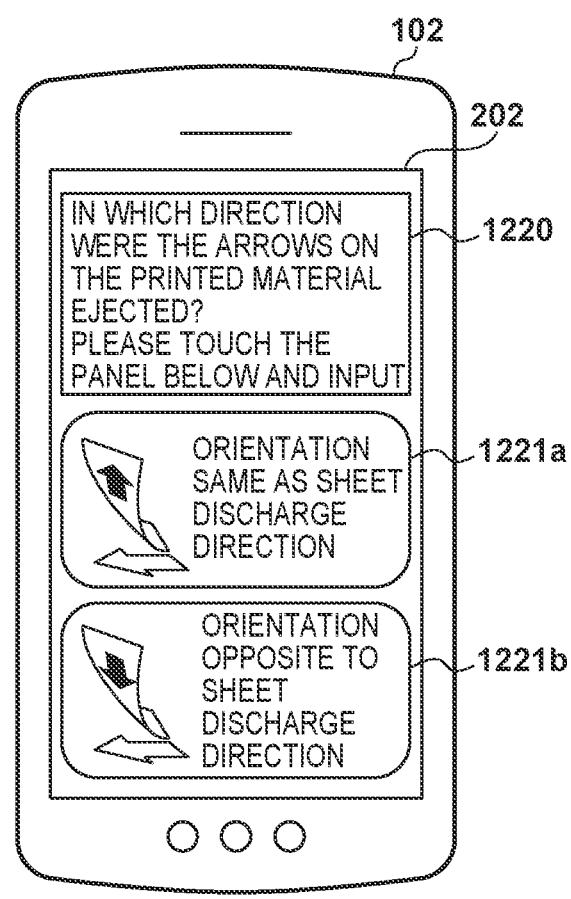

As illustrated in FIG. 11A, in step S1102, the control unit 201 obtains the print direction information of the image forming apparatus 101 based on a user input made through the interface unit 202. As illustrated in FIG. 12C, the interface unit 202 displays a guidance message 1220 for the user and two operation buttons 1221a and 1221b. The user 1210 operates one of the operation buttons 1221a or 1221b according to the guidance message 1220. In this example, the user 1210 presses the operation button 1221a when the discharge direction of the sheet P on which the direction determination image 1200 is formed is the same as the orientation of the direction determination image 1200. The user 1210 presses the operation button 1221b when the discharge direction of the sheet P on which the direction determination image 1200 is formed is the opposite orientation from the orientation of the direction determination image 1200. The control unit 201 identifies the standard print direction of the image forming apparatus 101 based on which of the operation buttons 1221a and 1221b is pressed in the interface unit 202. When the operation button 1221a is pressed, the control unit 201 determines that the standard print direction is the forward direction. When the operation button 1221b is pressed, the control unit 201 determines that the standard print direction is the reverse direction.

Other Embodiments

Figure 13:
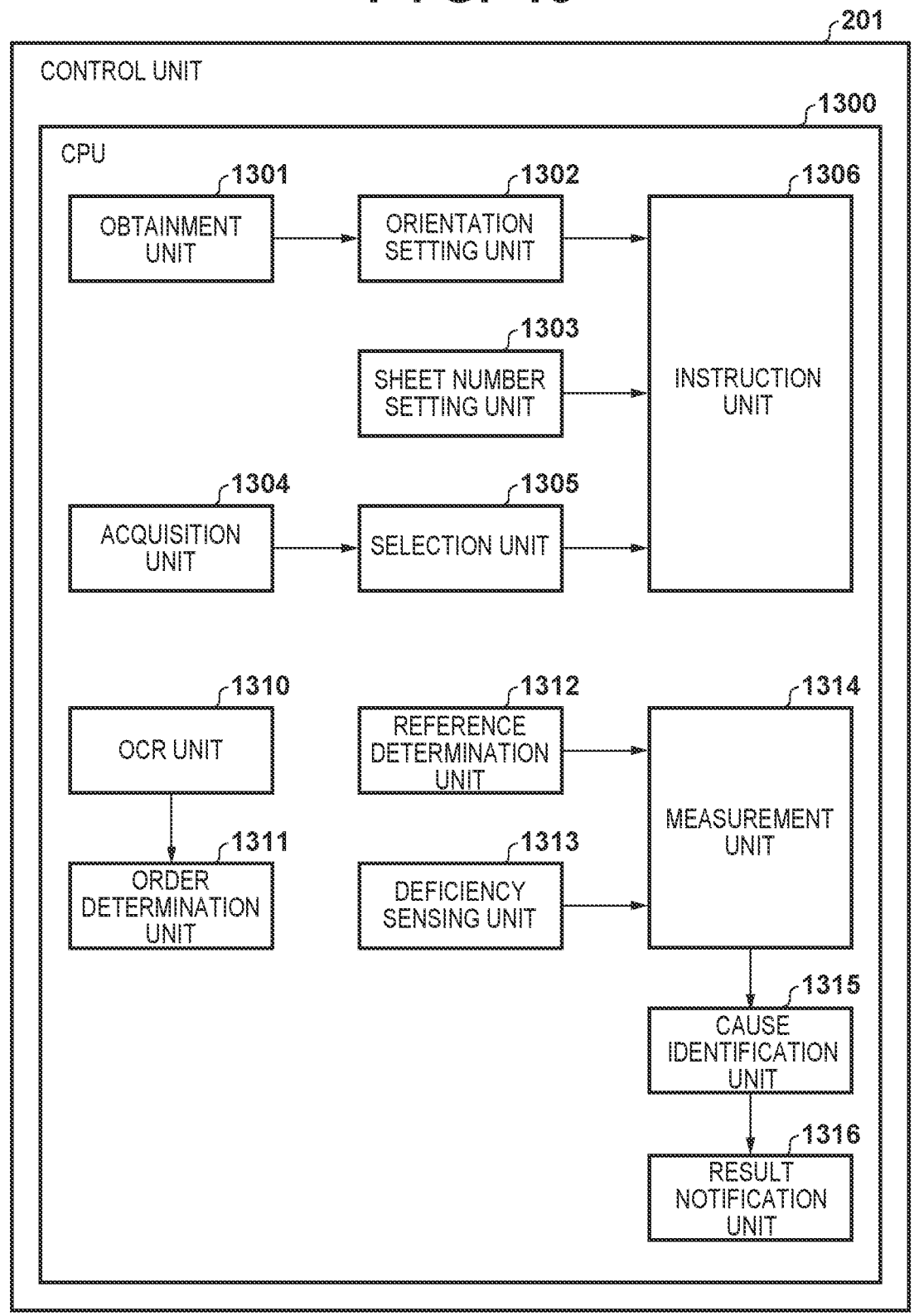
FIG. 13 is a diagram illustrating functions of a CPU.

FIG. 13 illustrates the functions realized by a CPU 1300 provided in the control unit 201 executing the diagnostic program 206. An obtainment unit 1301 acquires the model information 416 or the print direction information 418 of the image forming apparatus 101. The obtainment unit 1301 may acquire the model information 416 or the print direction information 418 from the image forming apparatus 101. The obtainment unit 1301 may obtain the print direction information 418 from the server 103 by transmitting the model information 416 to the server 103. Alternatively, the obtainment unit 1301 may obtain the model information 416 or the print direction information 418 in response to a user input made through the interface unit 202.

An orientation setting unit 1302 sets the printing orientation of the diagnostic image 600 according to the print direction information 418. As described above, the printing orientation is set so that the leading edge side of the sheet P matches the header side of the diagnostic image 600.

A sheet number setting unit 1303 compares the sizes of a plurality of components and determines the number of sheets P on which the diagnostic image 600 is to be formed according to the maximum size. For example, the circumferential length L3 of the intermediate transfer belt 8 is longer than the circumferential lengths of other rotating bodies, and the number of sheets P is therefore set based on the circumferential length L3.

An acquisition unit 1304 acquires the history data 417 from the image forming apparatus 101. A selection unit 1305 identifies a component that has been used beyond its design lifespan or is about to reach its design lifespan based on the history data 417. Furthermore, the selection unit 1305 selects, from among a plurality of diagnostic images, a diagnostic image suitable for sensing image deficiencies in which the component in question is the causative component.

An instruction unit 1306 transmits a printing instruction based on the orientation set by the orientation setting unit 1302, the number of sheets P set by the sheet number setting unit 1303, and the diagnostic image 600 selected by the selection unit 1305 to the image forming apparatus 101. The instruction unit 1306 may instruct the image forming apparatus 101 to print the direction determination image 1200 before instructing the printing of the diagnostic image 600. In this case, the obtainment unit 1301 may display the guidance message 1220 and the operation buttons 1221a and 1221b in the interface unit 202 and accept a user input of the print direction information 418.

An OCR unit 1310 performs optical character recognition (OCR) on the sheet image, and obtains identification information such as the page number and the like. An order determination unit 1311 determines the print order of the plurality of sheet images based on the identification information of each sheet image.

A reference determination unit 1312 determines a reference position that serves as a reference for measuring the distance with respect to the position of the image deficiency. In the example illustrated in FIG. 6B, the leading edge of the single-color pattern 601 is sensed by edge detection or pattern matching, and the position of the leading edge that has been sensed is output to a measurement unit 1314 as the reference position. The reference position may be the position of a single image deficiency among a plurality of image deficiencies occurring at regular intervals.

A deficiency sensing unit 1313 senses an image deficiency from the sheet image and outputs position information indicating the position of the image deficiency to the measurement unit 1314. If a plurality of sheet images are present, the deficiency sensing unit 1313 passes the position information of the image deficiency associated with the identification information (e.g., page number) of each sheet to the measurement unit 1314. The measurement unit 1314 measures the distance between the reference position and the position where the image deficiency occurred and passes the distance to the cause identification unit 1315.

A cause identification unit 1315 identifies the component causing the image deficiency based on the distance measured by the measurement unit 1314. For example, the cause identification unit 1315 may identify the causative component by comparing the distance to the circumferential length of each component. A result notification unit 1316 generates a diagnosis result and outputs the diagnosis result to the interface unit 202. The diagnosis result includes information on the component identified by the cause identification unit 1315.

A program that realizes one or more of the functions described in the foregoing embodiments may be supplied to a computer system or a computer device through a network or storage medium. Each of the foregoing embodiments may be realized by one or more processors in a computer system or computer device executing the program.

Technical Spirit Derived from Embodiments

Aspects A1, A28, and A29

As illustrated in FIG. 1, according to the foregoing embodiments, the diagnostic system 100 is provided. The camera 203 of the image capturing apparatus functions as an imaging unit that captures an image of a sheet on which a diagnostic image is formed and outputs a sheet image. The control unit 201 functions as a diagnosis unit that makes a diagnosis for a component of the image forming apparatus based on a position of an image deficiency in the sheet image. The interface unit 202 functions as an output unit that outputs a diagnosis result from the diagnosis unit. Accordingly, the image diagnosis can also be made for an image forming apparatus that does not include an image sensor. However, the image capturing apparatus 102 may make an image diagnosis for an image forming apparatus including an image sensor in its conveyance path or an image forming apparatus including an image scanner.

Aspect A2

The control unit 201, the communication unit 204, and the interface unit 202 function as an obtainment unit that obtains direction information pertaining to the direction in which the image forming apparatus forms the diagnostic image with respect to the sheet. The control unit 201 makes the diagnosis for the component of the image forming apparatus using the direction information and the position of the image deficiency in the sheet image. For example, the control unit 201 may set the printing orientation of the diagnostic image with respect to the conveyance direction of the sheet according to the direction information. Ensuring the conveyance direction of the sheet matches the printing orientation of the diagnostic image makes diagnosis results using sheet images more accurate.

Aspect A3

The control unit 201 may determine a reference position serving as a reference for the diagnosis based on the direction information. In FIG. 6B, the leading edge of the single-color pattern 601 in the conveyance direction of the sheet P is set as the reference position. According to FIGS. 6C, 8, and 9B, the position of one of a plurality of image deficiencies is set as the reference position. The control unit 201 may identify the component, among the plurality of components constituting the image forming apparatus, that is the cause of the image deficiency, based on the distance from the reference position to the position of the image deficiency.

The control unit 201 may determine a reference side, serving as a reference from the diagnosis, from among the four sides constituting the sheet image, based on the direction information. The control unit 201 may identify the component, among the plurality of components constituting the image forming apparatus, that is the cause of the image deficiency, based on the distance from the reference side to the position of the image deficiency. The reference side is the side on the leading edge side in the conveyance direction of the sheet in the image forming apparatus, among the four sides constituting the sheet image.

Aspects A4 and A5

The control unit 201 may set the print direction of the diagnostic image in the image forming apparatus based on the direction information, such that the orientation of the diagnostic image and the conveyance direction of the sheet match. The control unit 201 may set the print direction based on the direction information, such that the orientation of the diagnostic image and the discharge direction of the sheet from the image forming apparatus match. The control unit 201 may cause the image forming apparatus to form the diagnostic image by transmitting, to the image forming apparatus, designation information designating the print direction and image data for forming the diagnostic image. Here, the orientation of the diagnostic image and the conveyance direction of the sheet "matching" means that the header side of the diagnostic image matches the leading edge side of the sheet in the conveyance direction of the sheet. As illustrated in FIG. 6A, the afterimage 603 of the single-color pattern 601 arises downstream from the single-color pattern 601 in the conveyance direction of the sheet P. As such, to sense this type of image deficiency, it is, as a rule, necessary for the header side of the diagnostic image to match the leading edge side of the sheet in the conveyance direction of the sheet.

Aspects A6 to A11

The control unit 201 may obtain the direction information from the image forming apparatus. The communication unit 204 may function as a communication unit that communicates with the server 103. The control unit 201 may obtain the direction information from the server 103. In this case, the control unit 201 may obtain the direction information from the server 103 by transmitting identification information of the image forming apparatus to the server 103. The input device of the interface unit 202 functions as an input unit that accepts user inputs. The control unit 201 may obtain the direction information through the input unit. The control unit 201 functions as an instruction unit that instructs the image forming apparatus to form the direction determination image on the sheet. In this case, the control unit 201 may obtain the direction information based on information input by a user after the direction determination image is formed on the sheet. As illustrated in FIG. 12C, a user input may be present pertaining to whether the orientation of the direction determination image matches the discharge direction, from the image forming apparatus, of the sheet on which the direction determination image is formed. The control unit 201 may obtain the direction information through such user input.

Aspects A12 to A16

The control unit 201 functions as a setting unit that sets, in the image forming apparatus, a total number of sheets on which the diagnostic image is formed, according to a size of the component constituting the image forming apparatus. As illustrated in FIG. 8, the control unit 201 may make the diagnosis based on a total number of sheet images according to the total number of sheets. Through this, the causative component can be identified from image deficiencies occurring at intervals longer than the length of a single sheet. Accordingly, the total number of the sheets may be set based on a maximum circumferential length among circumferential lengths of a plurality of rotating bodies constituting the image forming apparatus. The total number of sheets may be set based on a length that is at least one times or two times the maximum circumferential length. When the total number of sheets is at least two, the image forming apparatus may form, on each of the sheets, the diagnostic image and identification information (e.g., a page number) of each of the sheets. The control unit 201 may identify the print order and the print direction of the plurality of sheet images based on the position of the identification information of the sheet in the sheet image. The control unit 201 may measure the interval at which an image deficiency occurs across the plurality of sheet images based on the print order and the print direction, and based on the interval, identify a component, among the plurality of components constituting the image forming apparatus, that is a cause of the image deficiency. As illustrated in FIG. 8, when the page number is formed on the header side, the control unit 201 can determine the side of the sheet image closest to the page number as the leading edge side of the sheet image. Furthermore, the control unit 201 can obtain the page number through optical character recognition (OCR) processing, and can therefore identify the print order of the plurality of sheet images.

Aspects A17 to A19

The control unit 201 and the communication unit 204 function as an acquisition unit that acquires state information indicating a usage history of the image forming apparatus or a wear state of the component. Furthermore, the control unit 201 functions as a selection unit that selects the diagnostic image corresponding to state information from among the plurality of diagnostic images. The image forming apparatus forms, on the sheet, the diagnostic image selected by the selection unit. The control unit 201 may identify a component, among the plurality of components constituting the image forming apparatus, that has reached a maintenance period specified by design, based on the state information. The control unit 201 may select a diagnostic image corresponding to the component that has reached the maintenance period specified by design. The control unit 201 may identify a component, among the plurality of components constituting the image forming apparatus, that is approaching a maintenance period specified by design, based on the state information. The control unit 201 may select a diagnostic image corresponding to the component that is approaching the maintenance period specified by design. Image deficiencies will be sensed more accurately as a result.

Aspects A20 and A21

The component may be a rotating body, or may be a plate-shaped member such as the cleaner 4. The control unit 201 may identify the rotating body that is the cause of the image deficiency based on a distance correlated with the rotation cycle of the rotating body and a distance obtained from the position of the image deficiency. Note that when the cleaner 4 wears down, streaks extending parallel to the conveyance direction of the sheet P may appear.

Aspects A22 to A25

The diagnostic image may be any image prepared by a user. The diagnostic image may include a first pattern formed from toner of a single color and a second pattern formed by mixing a plurality of different colors. In the image forming apparatus, the first pattern (e.g., the single-color pattern 601) is formed before the second pattern (the halftone pattern 602). As illustrated in FIGS. 6A and 9A, the diagnostic image may include a single-color pattern region containing a pattern of a single color, and a white region or a mixed-color pattern region formed nearer to a footer side of the diagnostic image than the single-color pattern region. In this case, the pattern region is formed before the white region or the mixed-color pattern region. In other words, toner from the pattern region adheres to the surface of the component, and the adhering toner is then transferred again from the pattern region to the white region or the mixed-color pattern region. The image deficiency may be made apparent in this manner.

Aspect A26

The diagnosis result may include information indicating the component that is the cause of the image deficiency. Through this, the user will be able to understand which component requires maintenance (cleaning, repair, or replacement).

Aspect A27

The image capturing apparatus includes a digital camera or a portable communication device (e.g., a smartphone, a tablet terminal) equipped with a camera. These have become commonplace, and will enable the user to make a diagnosis with ease.

The image capturing apparatus 102 is an example of an image capturing apparatus that captures an image of the sheet on which the diagnostic image is formed and which has been discharged from the image forming apparatus, and outputs the image captured as a sheet image. The server 103 may function as a diagnostic apparatus that makes a diagnosis for a component of the image forming apparatus based on a position of an image deficiency in the sheet image obtained by the image capturing apparatus, and outputs a diagnosis result. In this case, the functions of the control unit 201 illustrated in FIG. 13 are provided by the control unit 401 of the server 103. Furthermore, another information processing apparatus may function as the diagnostic apparatus instead of the image capturing apparatus 102 or the server 103.

Third Embodiment

When components of an image forming apparatus reach the end of their useful life, image deficiencies may occur. Japanese Patent No. 5164458 describes identifying components that cause image deficiencies by reading an image on a sheet using an image sensor built into the image forming apparatus. Japanese Patent No. 6350474 describes capturing an image on a sheet using an image capturing apparatus such as a digital camera or a camera-equipped cell phone, and calibrating the image forming apparatus based on a result of the capture. "Calibration" in Japanese Patent No. 6350474 refers to updating a gamma correction table that corrects image tones.

According to the invention of Japanese Patent No. 5164458, an image forming apparatus lacking an image sensor cannot identify the components that cause image deficiencies. In this case, a user must purchase an image forming apparatus equipped with an image sensor. The invention of Japanese Patent No. 6350474 cannot detect image deficiencies in the first place, nor can it identify components that cause image deficiencies.

Diagnostic System

The diagnostic system 100 is as described with reference to FIG. 1.

Image Capturing Apparatus

Figure 14:
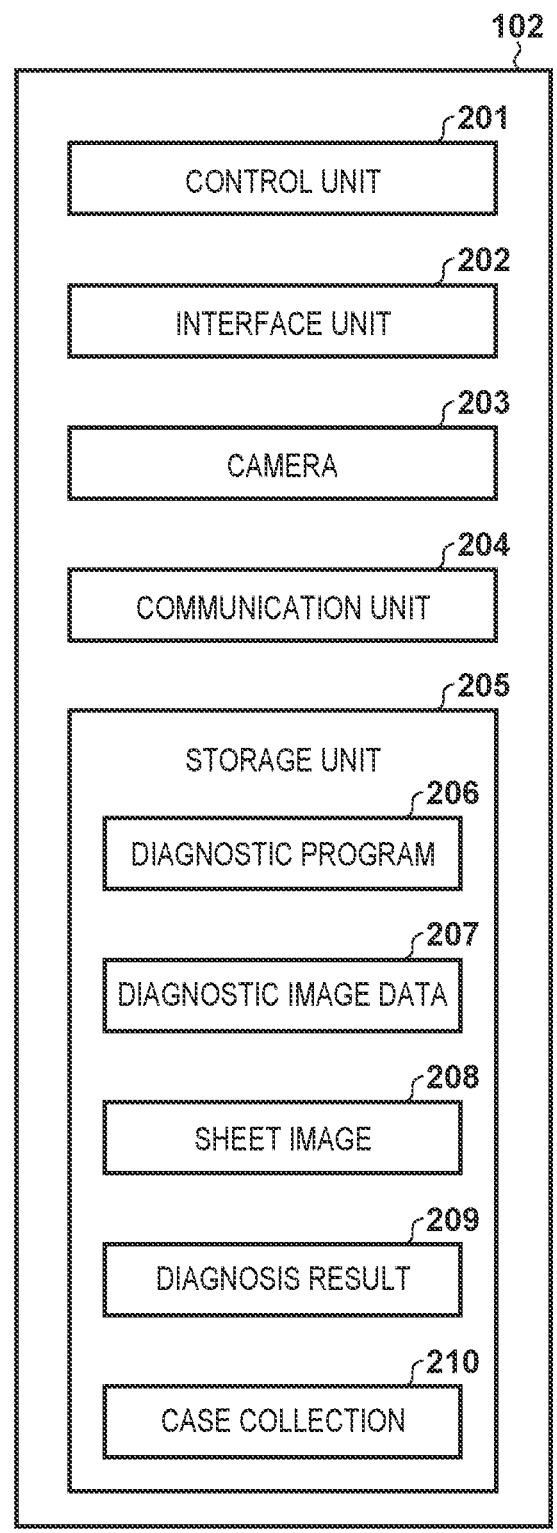
FIG. 14 is a diagram illustrating an image capturing apparatus.

FIG. 14 illustrates the configuration of the image capturing apparatus 102. A control unit 201 controls an interface unit 202, a camera 203, a communication unit 204, and a storage unit 205 according to a control program stored in the storage unit 205. The control unit 201 includes hardware circuitry such as a central processing unit (CPU), an application-specific integrated circuit (ASIC), and a field programmable gate array (FPGA). The interface unit 202 includes an output device (e.g., a display device, an audio output device) that outputs information to the user and an input device that accepts user inputs (e.g., a touch panel sensor). The camera 203 includes an image sensor (e.g., a CMOS image sensor or a CCD image sensor), a light source that emits illumination light, and the like. The communication unit 204 includes the wireless communication circuitry and the wired communication circuitry mentioned above. The storage unit 205 includes random access memory (RAM), read-only memory (ROM), and the like. The storage unit 205 stores a control program (e.g., the diagnostic program 206) executed by the control unit 201 and control data (e.g., the diagnostic image data 207) in a ROM region. The diagnostic image data 207 is original image data of a diagnostic image formed on a sheet. The storage unit 205 stores the sheet image 208 obtained by the camera 203, the diagnostic result 209, a case collection 210, and the like in a RAM region. The case collection 210 is a data group associating the characteristics of image deficiencies with causative components. The control unit 201 identifies the causative component by referring to the case collection 210 based on image deficiency characteristics that have been sensed.

Image Forming Apparatus

Figure 15:
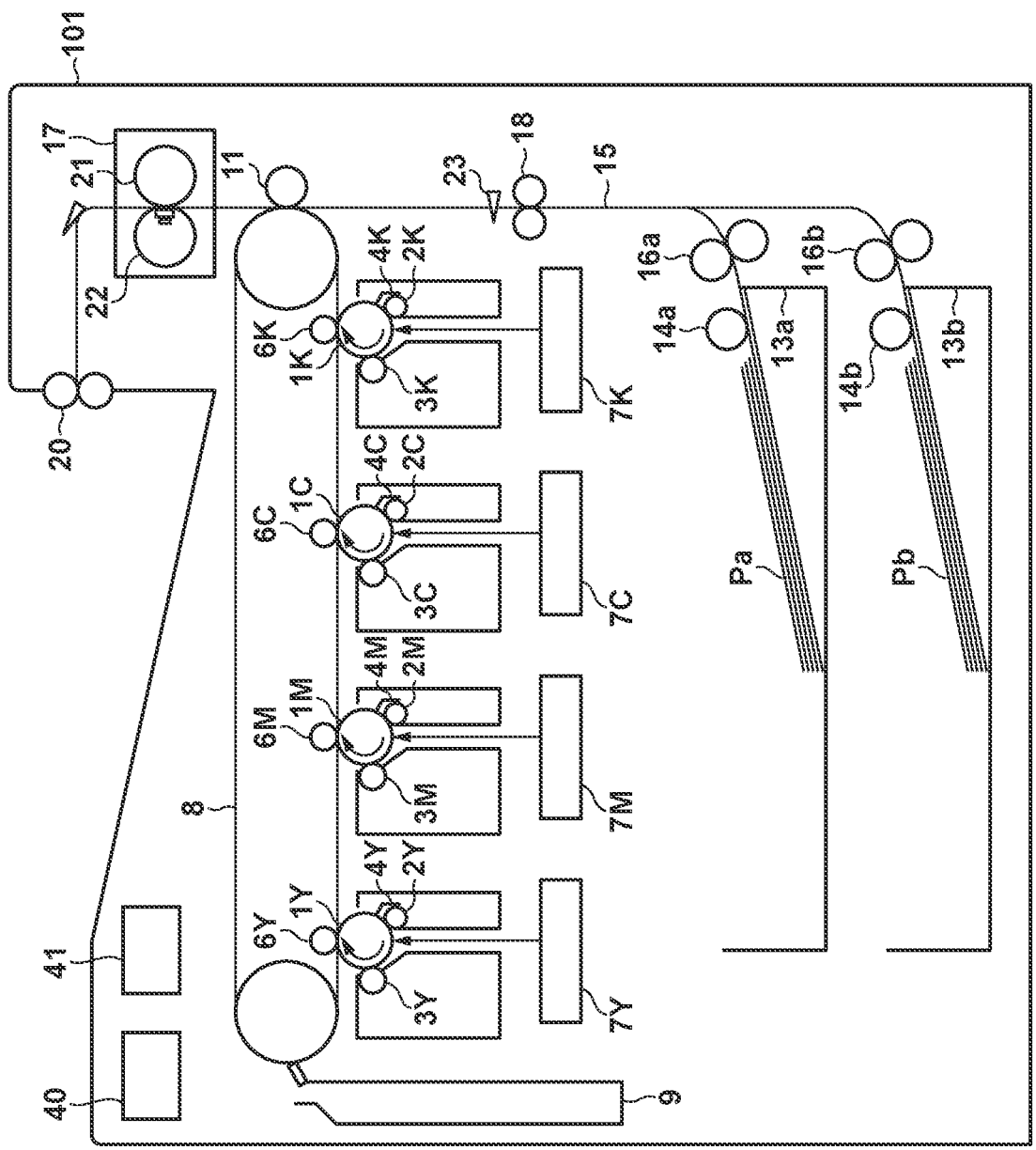
FIG. 15 is a diagram illustrating an image forming apparatus.

Although FIG. 15 illustrates an electrophotographic image forming apparatus 101, the technical spirit of the present embodiment can be applied in the same manner to any image forming apparatus in which components such as a rotating body are used for the formation of images. For example, the technical spirit of the present embodiment is applicable to any image forming apparatus in which image deficiencies occur in an image formed on a sheet P due to the components having reached the end of their useful life, components malfunctioning, and the like. The technical spirit of the present embodiment is also applicable in any image forming apparatus in which image deficiencies occur when components which require regular maintenance (cleaning, tuning, and replacement) have not been given such regular maintenance.

In FIG. 15, the letters Y, M, C, and K appended to the ends of the reference signs indicate toner colors, i.e., yellow, magenta, cyan, and black. For example, components with a Y appended to the end of the reference signs are involved in the formation of a yellow toner image. When there is no need to distinguish among the colors in describing the components, reference signs without the appended letters are used.

The control unit 40 is a control circuit (e.g., a CPU, an ASIC, and an FPGA) that controls the various parts of the image forming apparatus 101. The control unit 40 receives image data and printing instructions from an external device (e.g., the image capturing apparatus 102) through the communication unit 41. The control unit 40 converts the image data to generate an image signal, and supplies the image signal to the exposure device 7.

The photosensitive member 1 is an image carrier that is driven by a drive source such as a motor and rotates clockwise, and carries an electrostatic latent image and a toner image. The photosensitive member 1 is sometimes called a photosensitive drum due to being a cylindrical rotating body. The charging roller 2 charges the surface of the photosensitive member 1 to a uniform potential by a charging bias voltage being applied by the control unit 40. The exposure device 7 forms an electrostatic latent image on the surface (circumferential surface) of the photosensitive member 1 by irradiating the surface of the photosensitive member 1 with laser light corresponding to the image signal. The developing roller 3 is applied with a developing bias voltage by the control unit 40, and forms a toner image on the surface of the photosensitive member 1 by causing toner to adhere to the electrostatic latent image. The primary transfer roller 6 has a primary transfer bias voltage applied by the control unit 40, and transfers the toner image from the photosensitive member 1 to the intermediate transfer belt 8. A drum cleaner 4 is a member that removes and collects toner that has not been transferred to the intermediate transfer belt 8 and remains on the photosensitive member 1. The photosensitive member 1, the developing roller 3, the charging roller 2, and the drum cleaner 4 may be integrated within a cartridge. Such a cartridge is configured to be removable from the main body of the image forming apparatus 101. The photosensitive member 1, the charging roller 2, the exposure device 7, the developing roller 3, and the primary transfer roller 6 function as an image forming unit that forms an image on the intermediate transfer belt 8.

The intermediate transfer belt 8 is an endless belt, and is sometimes referred to as an intermediate transfer body. The intermediate transfer belt 8 is driven by a drive source such as a motor, and rotates counterclockwise. Toner images from each of the four photosensitive members 1 are superimposed and transferred onto the intermediate transfer belt 8, and a full-color toner image is formed on the intermediate transfer belt 8 as a result. The toner image transferred onto the intermediate transfer belt 8 is conveyed to a secondary transfer section. The secondary transfer section is a nip section formed by the intermediate transfer belt 8 and the secondary transfer roller 11.

The image forming apparatus 101 has an upper cassette 13a and a lower cassette 13b, which are feed trays for feeding sheets. In FIG. 15, an "a" at the end of a reference sign indicates that the item relates to the upper cassette 13a. A "b" at the end of a reference sign indicates that the item relates to the lower cassette 13b. When items common to the upper cassette 13a and the lower cassette 13b are described, the "a" and "b" at the end of the reference signs are omitted. The cassette 13 is a holding unit that holds a large number of sheets P. A feed roller 14 feeds the sheet P from the cassette 13 to the conveyance path 15 according to instructions from the control unit 40. The sheet P is conveyed to the secondary transfer section by conveyance rollers 16 and 18 provided along the conveyance path 15. The conveyance roller 18 is sometimes referred to as a "registration roller". A sheet sensor 23 may be provided downstream from the conveyance roller 18 in the conveyance direction of the sheet P. The sheet sensor 23 is a sensor that senses the presence or absence of the sheet P. The sheet sensor 23 can sense the arrival of the leading edge (the top edge) of the sheet P, and is therefore sometimes called a "top sensor".

To simplify the descriptions, it is assumed that the upper cassette 13a holds A4-size sheets Pa. It is assumed that the lower cassette 13b holds B5-size sheets Pb. The long sides of the A4-size sheets Pa and the B5-size sheets Pb are each parallel to the conveyance direction. In other words, the short sides of the A4-size sheets Pa and the short sides of the B5-size sheets Pb are each orthogonal to the conveyance direction.

The secondary transfer roller 11 has a secondary transfer bias voltage applied by the control unit 40, and transfers the toner image from the intermediate transfer belt 8 onto the sheet P. A belt cleaner 9 removes and collects toner that is not transferred to the sheet P and remains on the intermediate transfer belt 8. The secondary transfer roller 11 conveys the sheet P to the fixer 17. The fixer 17 includes two rotating bodies (the fixing roller 22 and the pressure roller 21), and fixes the toner image onto the sheet P by applying heat and pressure to the sheet P and the toner image. As the fixing roller 22 and the pressure roller 21 rotate, the sheet P is conveyed to a discharge roller 20. The discharge roller 20 discharges the sheet P to the exterior of the image forming apparatus 101.

Feed Trays

Figure 16:
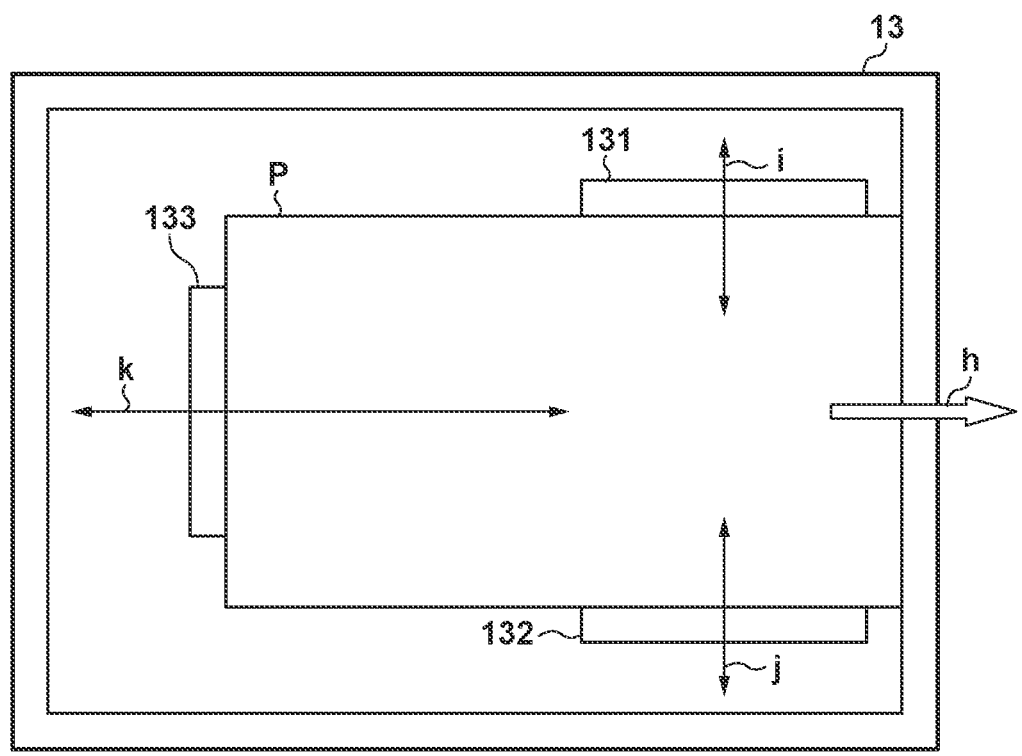
FIG. 16 is a diagram illustrating a sheet cassette.

FIG. 16 is a plan view of the upper cassette 13a and the lower cassette 13b. The upper cassette 13a and lower cassette 13b share the same configuration, and thus the "a" and "b" at the end of the reference signs codes are omitted in FIG. 16.

Arrow h indicates the conveyance direction of the sheet P by the feed roller 14. Regulation plates 131 and 132 are members that regulate the position of the sheet P in the width direction. In FIG. 16, the width direction of the sheet P is the direction orthogonal to the conveyance direction of the sheet P. In FIG. 16, the long side of the sheet P is parallel to the conveyance direction of the sheet P. The short side of the sheet P is orthogonal to the conveyance direction of the sheet P. The regulation plate 131 is movable in the direction indicated by arrow i. The regulation plate 132 is movable in the direction indicated by arrow j. By moving in tandem, the regulation plates 131 and 132 can center the sheet P with respect to the conveyance path 15. A regulation plate 133 is movable in the direction indicated by arrow k, and regulates the position of an end part of the sheet P in the conveyance direction of the sheet P. By moving the regulation plates 131, 132, and 133, the upper cassette 13a and the lower cassette 13b can each accommodate sheets P from A6 size to A4 size. However, all sheets P from A6 size to A4 size are assumed to be placed vertically, as illustrated in FIG. 16. "Placed vertically" means that the sheet P is placed so that the long side thereof is parallel to the conveyance direction.

Control Unit of Server

Figure 17A:
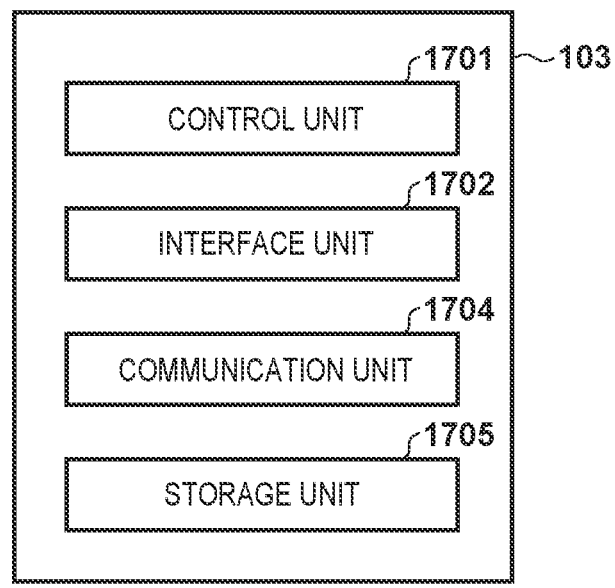
FIGS. 17A and 17B are diagrams illustrating a server and a control unit of the image forming apparatus.

As illustrated in FIG. 17A, the server 103 includes a control unit 1701, an interface unit 1702, a communication unit 1704, and a storage unit 1705. The control unit 1701 includes a CPU and the like that execute a control program stored in the storage unit 1705. The control program may be the diagnostic program 206. This enables the server 103 to function as a diagnostic apparatus instead of the image capturing apparatus 102. However, even when the server 103 functions as the diagnostic apparatus, the sheet image is generated by the image capturing apparatus 102. The interface unit 1702 includes an input device and a display device. The interface unit 1702 may display the diagnosis result generated in the image capturing apparatus 102 or the server 103. The communication unit 1704 is communication circuitry that communicates with the image capturing apparatus 102 and the image forming apparatus 101 over the network. The storage unit 1705 includes ROM, RAM, a solid state drive (SSD), and a hard disk drive (HDD).

Control Unit of Image Forming Apparatus

Figure 17B:
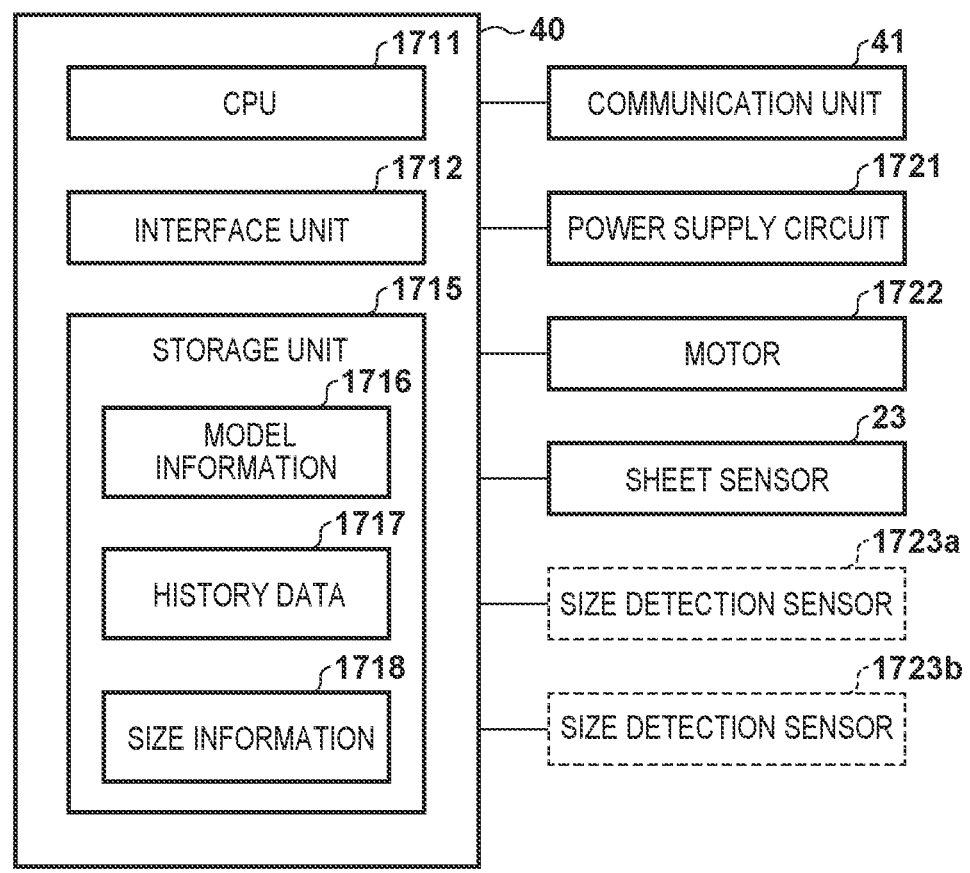

FIG. 17B illustrates the control unit 40 of the image forming apparatus 101. A CPU 1711 controls each unit of the image forming apparatus 101 by executing a control program stored in a storage unit 1715. For example, upon receiving a printing instruction for the diagnostic image from the image capturing apparatus 102, the CPU 1711 controls the image forming apparatus 101 to form the diagnostic image on the sheet P. At this time, the CPU 1711 controls a power supply circuit 1721 to generate the charging bias voltage, the developing bias voltage, and the transfer bias voltages. Additionally, the CPU 1711 rotates the various types of rotating bodies, such as the photosensitive member 1, by driving a motor 1722. An interface unit 1712 includes an input device and a display device. The interface unit 1712 may display the diagnosis result generated by the image capturing apparatus 102 or the server 103. Alternatively, when CPU 1711 functions as a diagnostic apparatus by executing a diagnostic program, the CPU 1711 acquires the sheet image from the image capturing apparatus 102 through the communication unit 41, and executes image distortion correction and image diagnosis. The storage unit 1715 includes RAM, ROM, an SSD, an HDD, and the like. The storage unit 1715 stores model information 1716, which is identification information of the image forming apparatus 101. The CPU 1711 may store information indicating a usage history of the image forming apparatus 101 (e.g., a cumulative number of images formed) or the replacement time of each component in the storage unit 1715 as history data 1717. The storage unit 1715 stores size information 1718 indicating a size input or selected by the user through the interface unit 1712 or the size of the sheet P detected by the sheet sensor 23 or size sensors 1723a and 1723b. The first size sensor 1723a and the second size sensor 1723b are optional. The first size sensor 1723a detects the size of the sheet P (e.g., the length of the long side and the length of the short side) based on the positions of the regulation plates 131, 132, and 133. The second size sensor 1723b may be a line sensor installed in the conveyance path 15. The line sensor has a plurality of light-receiving elements provided parallel to the width direction of the conveyance path 15 (orthogonal to the conveyance direction), and a light source (a light-emitting element). The light from the light source to the plurality of light-receiving elements is blocked by the sheet P. Accordingly, the size sensor 1723b can sense the length of the sheet P in the shorter direction from the number of light-receiving elements that could not receive light among the plurality of light-receiving elements. Furthermore, the size sensor 1723b can sense the length of the long side of the sheet P based on the time for which the light is blocked by the sheet P and the conveyance speed of the sheet P (e.g., 180 mm/sec).

Flowcharts

Processing of Diagnostic Apparatus

Figure 18A:
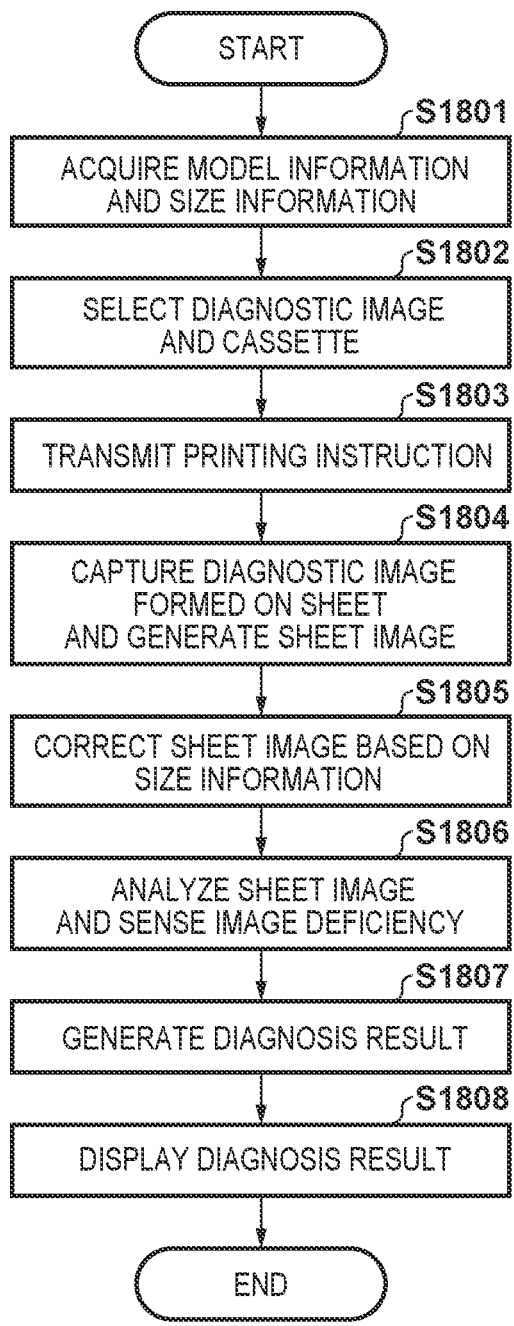

FIG. 18A illustrates an image diagnosis method executed by a CPU provided in the control unit 201 of the image capturing apparatus 102, according to the diagnostic program 206. When the control unit 201 is instructed to launch the diagnostic program 206 through the interface unit 202, the control unit 201 launches the diagnostic program 206 and executes the following processing.

In step S1801, the control unit 201 obtains the model information 1716 and the size information 1718 of the image forming apparatus 101. For example, the control unit 201 connects to the image forming apparatus 101 through the communication unit 204 and transmits a request to the image forming apparatus 101. As a result, the control unit 201 receives the model information 1716 and the size information 1718 through the communication unit 204. The model information 1716 includes a product number, a model name, and the like of the image forming apparatus 101. The size information 1718 may include the size of the sheets Pa in the upper cassette 13a and the size of sheets Pb in the lower cassette 13b.

In step S1802, the control unit 201 selects a diagnostic image and a cassette. For example, the control unit 201 selects the diagnostic image data 207 associated with the model information 1716 from the plurality of diagnostic image data 207 stored in the storage unit 205. This association may be held in the case collection 210. The control unit 201 may also select the diagnostic image data 207 based on the history data 1717 obtained from the image forming apparatus 101. For example, the control unit 201 identifies a component, among the components of the image forming apparatus 101, that is nearing or has exceeded its use-by date by design, based on the history data 1717. In addition, the control unit 201 selects diagnostic image data 207 for a diagnostic image that makes it easy to sense image deficiencies that may occur in the identified component. The control unit 201 selects the upper cassette 13a or the lower cassette 13b based on the size information 1718. In general, a larger sheet P makes it possible to sense image deficiencies over a broader range in the width direction of the sheet P than a smaller sheet P. Accordingly, the control unit 201 may select the upper cassette 13a based on the size information 1718.

Figure 19A:
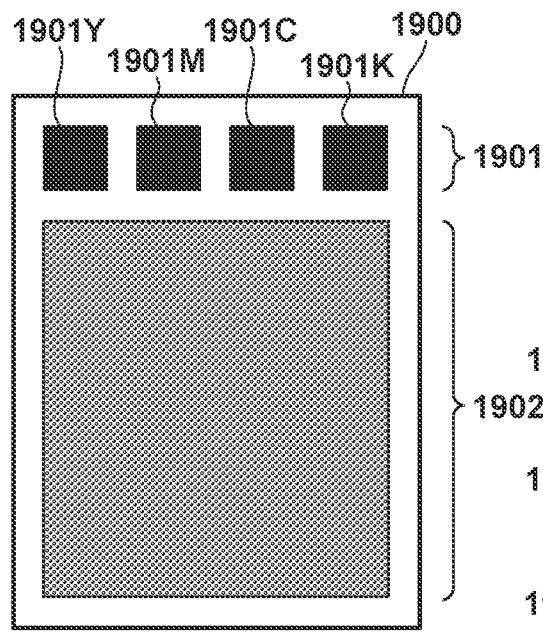
FIGS. 19A to 19D are diagrams illustrating a diagnostic image and a sheet image.

FIG. 19A illustrates an example of a diagnostic image 1900 generated based on the diagnostic image data 207. The diagnostic image 1900 includes a single-color pattern 1901 and a halftone pattern 1902. The single-color pattern 1901 includes a test image formed from one color among Y, M, C, and K. The halftone pattern 1902 includes a gradation image formed by mixing all of the Y, M, C, and K colors.

In step S1803, the control unit 201 transmits, to the image forming apparatus 101, a printing instruction to print the diagnostic image 1900. The printing instruction includes the diagnostic image data 207 that is the source of the diagnostic image 1900, and the designation information of the cassette 13.

In step S1804, the control unit 201 controls the camera 203 to capture the diagnostic image 1900 formed on the sheet P by the image forming apparatus 101 and generate a sheet image. For example, the control unit 201 may display a guidance message prompting the user to capture the diagnostic image 1900 in the display device of the interface unit 202. The user then operates the input device of the interface unit 202 in response to the guidance and captures the diagnostic image 1900 on the sheet P. As a result, the sheet image 208 is generated and saved in a RAM region of the storage unit 205.

Figure 19C:
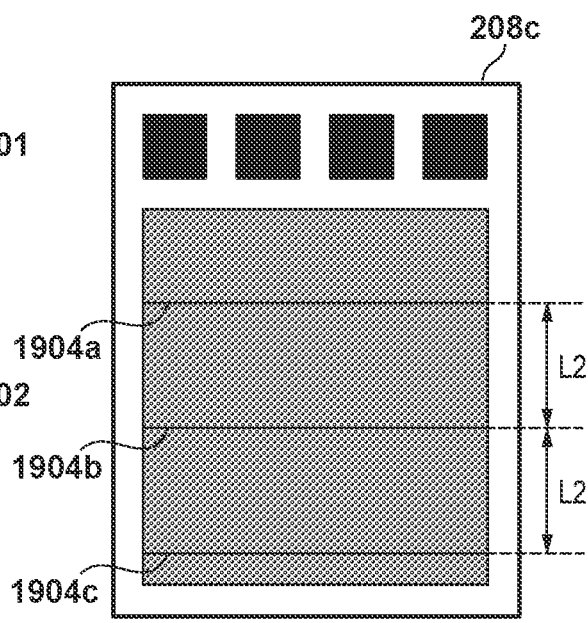
Figure 19B:
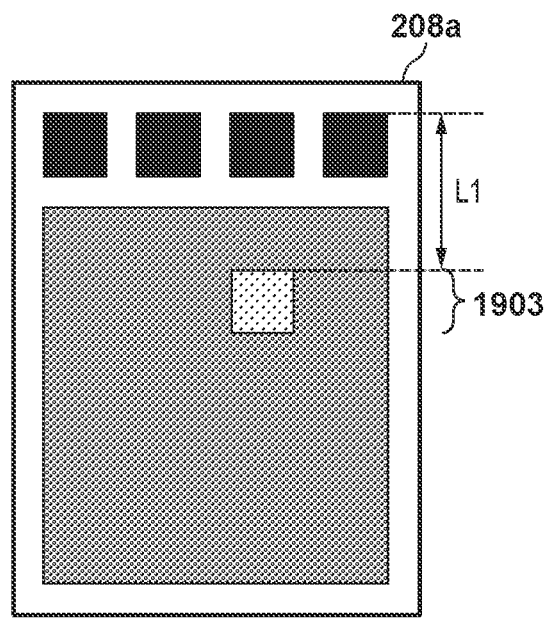

FIG. 19B illustrates a sheet image 208a showing drum ghosting. The single-color pattern 1901 is an image pattern useful for sensing an image deficiency known as "drum ghosting". "Drum ghosting" is an image deficiency that can occur due to deterioration of the photosensitive member 1. As illustrated in FIG. 19B, the single-color pattern 1901 formed first appears as an afterimage 1903. Here, a distance L1 between the single-color pattern 1901 and the afterimage 1903 corresponds to the circumferential length of the photosensitive member 1. The density of the afterimage 1903 differs from the density of the regular halftone pattern 1902. The control unit 201 can determine the presence or absence of drum ghosting by comparing the image density at a position distanced from the single-color pattern 1901 by the distance L1 with a reference density (the density of the halftone pattern 1902). Determination rules for such drum ghosting are included in the case collection 210.

The halftone pattern 1902 is an image pattern mainly used to sense the occurrence of defects caused by the transport of the sheet P. Due to wear from years of use, drive gears, conveyance rollers, and the like may deteriorate or break. Image deficiencies 1904a to 1904c occur in the halftone pattern 1902 of a sheet image 208b illustrated in FIG. 19C. An interval L2 between the image deficiencies 1904a to 1904c is equivalent to the circumferential length of the drive gear or conveyance roller, and thus the control unit 201 can identify the drive gear or conveyance roller as defective. Such determination rules are also included in the case collection 210.

Figure 19D:
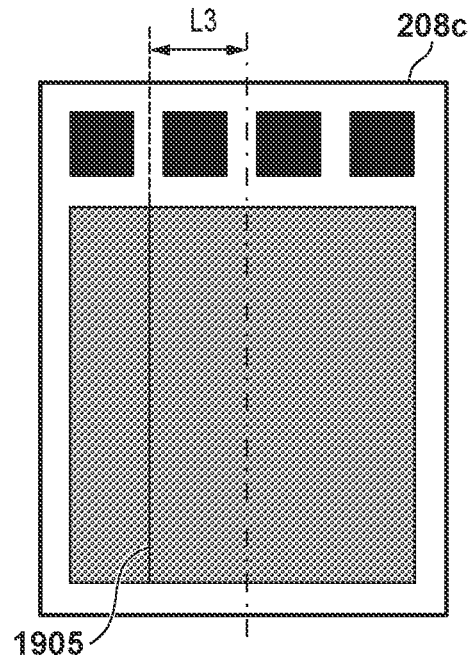

FIG. 19D illustrates an image deficiency 1905 (a line in the vertical direction) that can occur when foreign objects accumulate in the conveyance path 15. In this example, the foreign objects causing the image deficiency accumulate at the position of a distance L3 away from the center of the conveyance path 15 in the width direction.

In step S1805, the control unit 201 corrects the sheet image 208 based on the size information 1718. Because the user holds the image capturing apparatus 102 by hand to capture the diagnostic image 1900 on the sheet P, the sheet P and the diagnostic image 1900 appearing in the generated sheet image 208 may be rotated, distorted, or the like. Therefore, it is necessary to reduce the distortion of the sheet P and the diagnostic image 1900 in the sheet image 208.

Figure 20A:
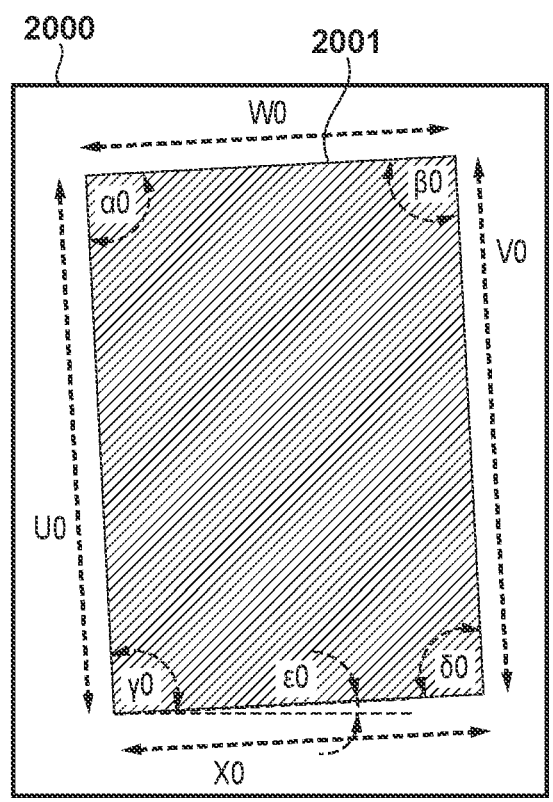
FIGS. 20A and 20B are diagrams illustrating an image correction method.

FIG. 20A illustrates the sheet image 208. A shooting frame 2000 is a frame that shows the shooting field of view of the camera 203. An image region 2001 indicates the region in the sheet image 208 where the sheet P on which the diagnostic image 1900 is formed appears. In this example, the sheet P is rotated with respect to the shooting frame 2000. Furthermore, if the imaging plane (image sensor) of the camera 203 and the sheet P are not parallel, the image of the sheet P will be distorted. In this manner, measuring the position of the image deficiency in a distorted sheet image 208 results in a large error in the measurement result. Accordingly, the control unit 201 corrects distortion in the sheet image 208.

First, the control unit 201 measures the lengths of the four sides of the image region 2001 in which the sheet P appears in the sheet image 208. The control unit 201 measures a length U0 of one long side, a length V0 of the other long side, a length W0 of one short side, and a length X0 of the other short side by counting the number of pixels corresponding to the four sides of the image region 2001. The control unit 201 may use a measurement function provided in the camera 203 to measure the lengths of the four sides. As an example, it is assumed that U0=260 mm, V0=320 mm, W0=200 mm, and X0=220 mm.

Figure 20B:
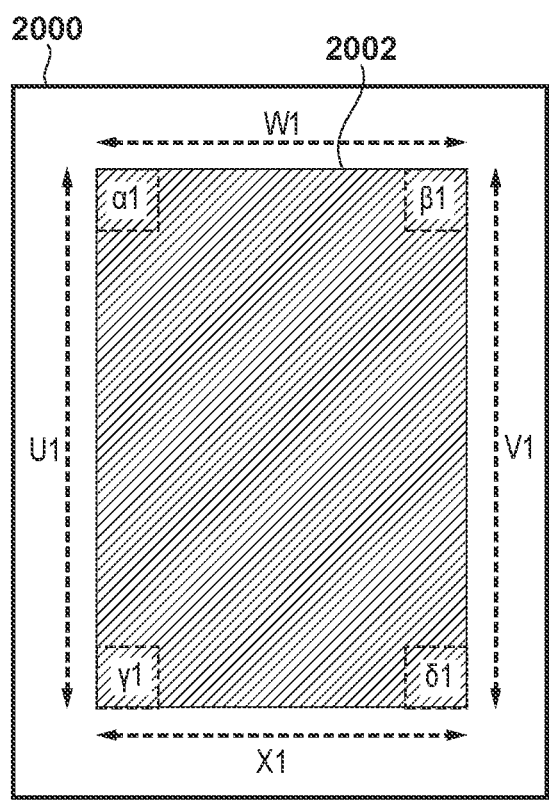

FIG. 20B illustrates an image region 2002 obtained by correcting the image region 2001. The image region 2002 is rotationally corrected after the dimensions of each side are corrected. The rotation correction may be performed prior to correcting the dimensions of each side. As FIG. 20A shows, the original image region 2001 is tilted at tilt 60 with respect to the shooting frame 2000. Internal angles α0, β0, γ0, and δ0 of the image region 2001 are also not 90 degrees. Accordingly, image correction is performed such that the tilt ε0=0° and the internal angles α0, β0, γ0, and δ0 are α1, β1, γ1, and δ1=90°.

Furthermore, the control unit 201 recognizes that the original size of the image region 2001 is the A4 size, based on the size information 1718. Accordingly, the control unit 201 corrects the image region 2001, in which the long sides U0=260 mm and V0=320 mm, to the image region 2002, in which U1 and V1=297 mm. Furthermore, the control unit 201 corrects the image region 2001, in which W0=200 mm and V0=220 mm, to the image region 2002, in which W1 and V1=210 mm. As a result, the sheet image 208, in which image deformation, rotation, and this like have been corrected, is generated.

In step S1806, the control unit 201 analyzes the sheet image 208 and senses an image deficiency. For example, the control unit 201 determines whether the afterimage 1903 occurs at a position distanced from the single-color pattern 1901 by the distance L1. Alternatively, the control unit 201 may sense the afterimage 1903, identify the position where the afterimage 1903 occurs, and determine whether the distance between the single-color pattern 1901 and the afterimage 1903 is the distance L1. Alternatively, the control unit 201 may sense a plurality of the image deficiencies 1904a to 1904c that occur periodically and measure the interval L2 between each of the plurality of the image deficiencies 1904a to 1904c. The distance L1 and the interval L2 are values that correlate to the rotation cycle (circumferential length) of the rotating body that causes the image deficiency, and the rotating body that causes the image deficiency can therefore be identified.

Incidentally, the distance L1, the interval L2, and the like may be measured based on the lengths U1 and V1 of the long sides. For example, the control unit 201 may calculate the actual lengths of the distance L1 and the interval L2 by measuring the ratio of the distance L1 and the interval L2 to the length U1 (=V1) and multiplying the ratio by the length U1.

Similarly, the distance L3 for the vertical stripe-type image deficiency 1905 illustrated in FIG. 19D is measured with respect to the short side lengths W1 and X1. For example, the control unit 201 may calculate the actual length of the distance L3 by measuring the ratio of the distance L3 to the length W1 (=X1) and multiplying the ratio by the length W1. From the size information 1718, the control unit 201 has ascertained that U1 and V1=297 mm, and that W1 and X1=210 mm. Accordingly, the control unit 201 can accurately measure L1, L2, and L3.

In step S1807, the control unit 201 generates a diagnosis result. The control unit 201 identifies the component (a causative component) constituting the image forming apparatus 101 based on the position of the image deficiency. The control unit 201 generates the diagnosis result, which indicates the installation location of the causative component within the image forming apparatus 101, the wear state of the causative component, the replacement time of the causative component, an ordering method of the causative component, and the like. The diagnosis result may include state information for each of the plurality of components, indicating whether the state is a normal state or a state in which maintenance is required. The diagnosis result may include information indicating measures for reducing image deficiencies (e.g., replacement, repair, cleaning, or the like). If no image deficiencies are sensed in step S1806, the diagnosis result includes information indicating that all components constituting the image forming apparatus 101 are operating normally.

In step S1808, the control unit 201 displays the diagnosis result in the display device of the interface unit 202. The control unit 201 may notify an administrator or maintenance worker of the diagnosis result by outputting (transmitting)

the diagnosis result to the server 103, the image forming apparatus 101, or a personal computer through the communication unit 204.

Processing by Image Forming Apparatus

Figure 18B:
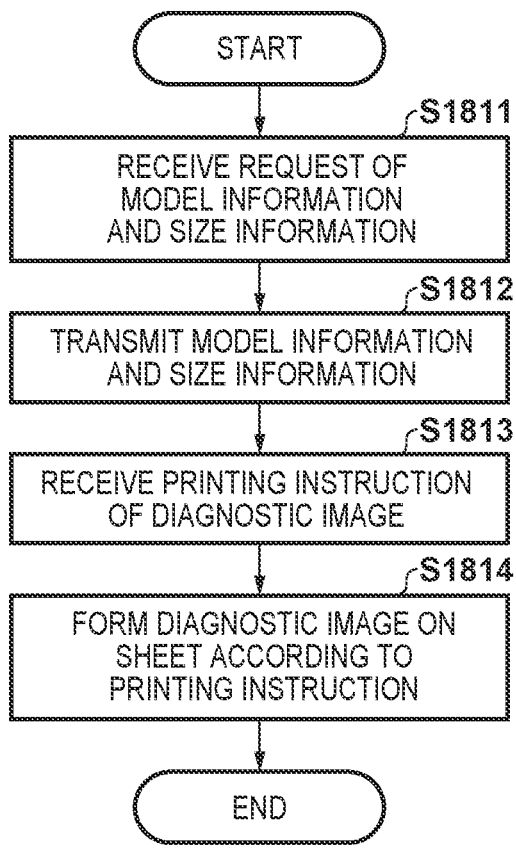

FIG. 18B illustrates a method for providing the model information 1716 and the size information 1718, executed by the CPU 1711 of the image forming apparatus 101. In step S1811, the CPU 1711 receives a request (a transmission request) for the model information 1716 and the size information 1718 from the image capturing apparatus 102. In step S1812, the CPU 1711 reads out the model information 1716 and the size information 1718 from the storage unit 1715, and transmits the model information 1716 and the size information 1718 to the image capturing apparatus 102 through the communication unit 41.

In step S1813, the CPU 1711 receives a printing instruction for the diagnostic image 1900 from the image capturing apparatus 102 through the communication unit 41. The printing instruction includes designation information for the cassette 13.

In step S1814, the CPU 1711 forms the diagnostic image 1900 on the sheet P according to the printing instruction. For example, the CPU 1711 drives the feed roller 14a to feed the sheet Pa from the upper cassette 13a designated by the printing instruction. Furthermore, the CPU 1711 controls the exposure device 7 based on the diagnostic image data 207 received from the image capturing apparatus 102. The diagnostic image 1900 is formed on the sheet Pa as a result.

The storage unit 205 stores the case collection 210 (cause identifying information) of image deficiencies that are expected to occur for each combination of the model information 1716 and diagnostic images. For example, if the afterimage 1903 occurs with the combination of the image forming apparatus 101 and the diagnostic image 1900, and the distance L1 is equal to the circumferential length of the photosensitive member 1, the case collection 210 indicating that deterioration of the photosensitive member 1 is the cause may be stored. In this manner, the case collection 210 may include a combination of the identification information of the image forming apparatus 101 and the identification information of the diagnostic image, characteristic information indicating the characteristics of the image deficiency, and identification information of the component that is the cause of the image deficiency. The control unit 201 selects the diagnostic image data 207 by referring to the case collection 210 stored in the storage unit 205, senses an image deficiency based on the characteristics of the image deficiency, and identifies the causative component based on the position of the image deficiency. The case collection 210 may include countermeasure information for reducing image deficiencies. By referring to the case collection 210, the control unit 201 identifies a method for reducing image deficiencies, and includes the method in the diagnostic result 209.

FIG. 21 is a table illustrating effects of the third embodiment. Here, the interval L2 has been measured for a horizontal stripe-type image deficiency 704, illustrated in FIG. 19C. Comparative Example 1 measures the interval L2 based on the length U0 of the long side in the image region 2001 illustrated in FIG. 20A, in which the correction processing of the third embodiment is not applied. Comparative Example 2 measures the interval L2 based on the length V0 of the long side in the image region 2001 illustrated in FIG. 20A, in which the correction processing of the third embodiment is not applied. Here, the circumferential length of the photosensitive member 1 is assumed to be 75.4 mm. The circumferential length of the pressure roller 21 is assumed to be 72.2 mm. The circumferential length of the fixing roller 22 is assumed to be 78.5 mm.

According to the third embodiment, the interval L2 is measured as 75.4 mm based on the lengths U1 and V1 of the long sides being 297 mm, based on the size information 1718. Accordingly, the control unit 201 correctly determines that the photosensitive member 1 is the causative component of the image deficiency 704. On the other hand, in Comparative Example 1, the interval L2 is measured as 72.4 mm, based on the length U0 before correction. As such, it is erroneously determined that the causative component is the pressure roller 21. In Comparative Example 2, the interval L2 is measured as 77.4 mm, based on the length V0 before correction. As such, it is erroneously determined that the causative component is the fixing roller 22. In this manner, it is important to obtain a reference length when diagnosing a plurality of rotating bodies, each of which has a similar outer diameter.

In the third embodiment, it is assumed that a plurality of diagnostic images are stored in the storage unit 205 of the image capturing apparatus 102, but this is only one example. The diagnostic image data 207 of the diagnostic image may be stored in the storage unit 1705 of the server 103. In this case, the control unit 201 may transmit the model information of the image forming apparatus 101 to the server 103, and the server 103 may read out the diagnostic image data 207 corresponding to the model information from the storage unit 1705 and transfer that data to the image capturing apparatus 102. This increases the free space in storage unit 205. Similarly, the case collection 210 for the image deficiencies may also be stored in the storage unit 1705 of the server 103. The control unit 201 of the image capturing apparatus 102 transmits the model information and the diagnostic image identification information to the server 103, and the control unit 1701 of the server 103 transmits the corresponding case collection 210 to the image capturing apparatus 102. The control unit 201 of the image capturing apparatus 102 may use the received case collection 210 to measure the characteristics of the image deficiency (the distance L1, the interval L2, and the like) and identify the causative component.

The server 103 may function as the diagnostic apparatus. In this case, the server 103 obtains the size information 1718 and the sheet image 208 through the image capturing apparatus 102. The control unit 1701 then identifies the causative component and generates a diagnosis result by executing processing similar to that executed by the control unit 201 described above. In this case, the diagnostic program 206, the diagnostic image data 207, the sheet image 208, and the diagnostic result 209 are stored in the storage unit 1705. Note that the control unit 1701 of the server 103 may obtain the size information 1718 directly from the image forming apparatus 101. This is because the control unit 1701 can communicate with the image forming apparatus 101 through the communication unit 1704.

Figure 22:
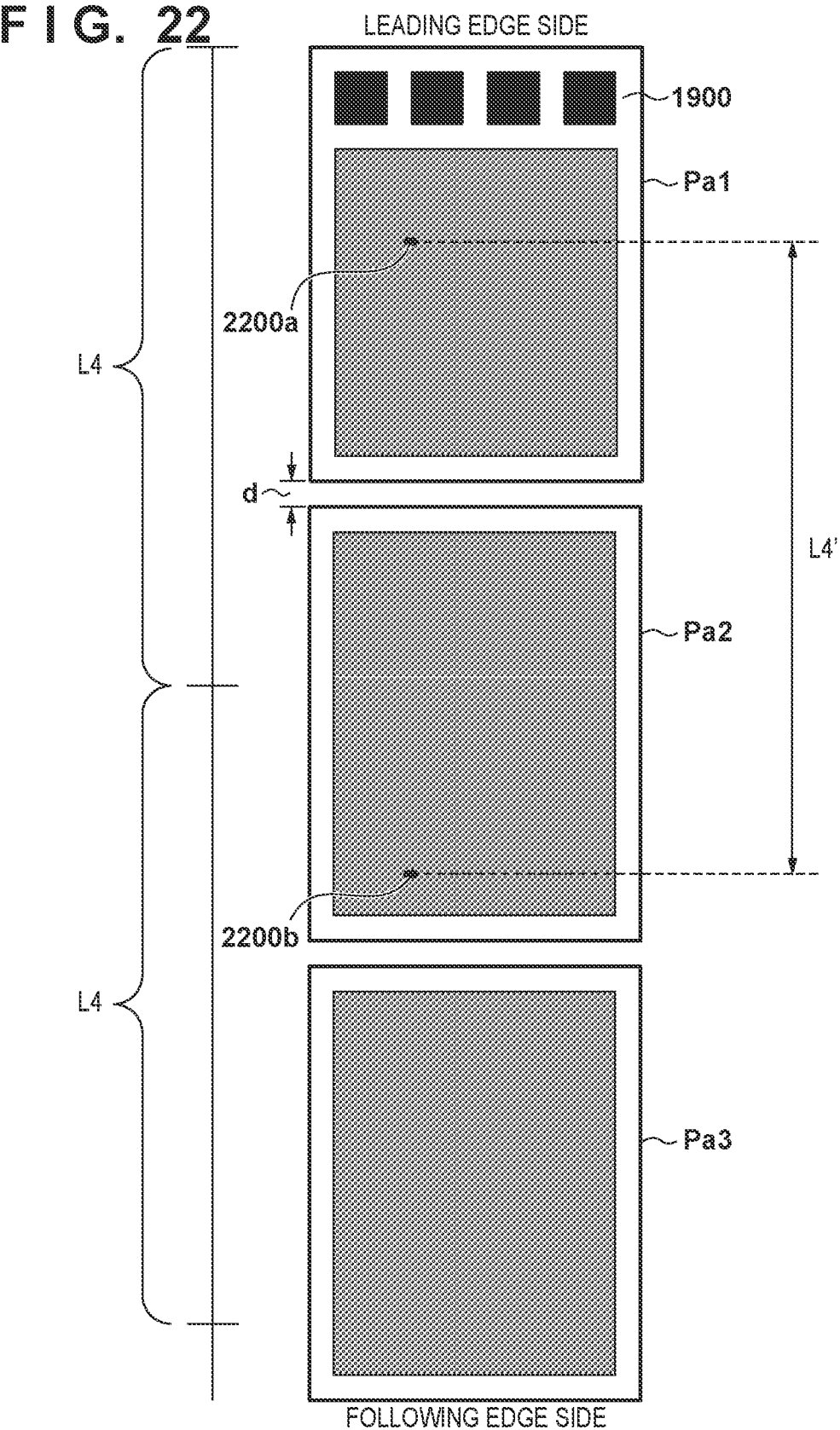
FIG. 22 is a diagram illustrating an image diagnosis method that uses a plurality of sheets.

FIG. 19A illustrates a one-page diagnostic image 1900, but this is only one example. As illustrated in FIG. 22, a diagnostic image 1900 constituted by a plurality of pages may be employed. This example indicates a relationship between the circumferential length L4 of the intermediate transfer belt 8 and three sheets Pa1, Pa2, and Pa3 on which the diagnostic image 1900 is formed. The diagnostic image 1900 is formed on the first sheet Pa1. Only the halftone pattern 1902 of the diagnostic image 1900 is formed on the second sheet Pa2. Only the halftone pattern 1902 of the diagnostic image 1900 is formed on the third sheet Pa3. Image deficiencies 2200a and 2200b caused by the intermediate transfer belt 8 occur periodically at intervals corresponding to the circumferential length L4. d represents the sheet interval between the preceding and following sheets as the sheets pass through the secondary transfer section. The control unit 201 generates the sheet image 208 from each of the three sheets Pa1, Pa2, and Pa3, applies the corrections described above, and measures an interval L4' of the image deficiencies 2200a and 2200b. The interval L4' is almost equal to the circumferential length L4, and thus the control unit 201 determines that the causative component is the intermediate transfer belt 8.

According to the third embodiment, the diagnostic system 100 can diagnose components of the image forming apparatus 101 using the image capturing apparatus 102, such as a smartphone. This enables the user to diagnose the image forming apparatus 101 more simply than before. Furthermore, a reading result of the diagnostic image 1900 formed on the sheet P (the sheet image 208) is corrected based on the size information 1718 of the sheet P. Accordingly, the measurement accuracy of the characteristics of image deficiencies is improved, and the accuracy of the diagnosis result is also improved.

Fourth Embodiment

In the third embodiment, the size sensor 1723a senses the size of the sheet P mainly by monitoring the positions of the regulation plates 131, 132, and 133 in the upper cassette 13a and the lower cassette 13b, respectively. The size sensor 1723a may incorrectly sense the size of the sheet P if the regulation plates 131, 132, and 133 are not positioned correctly.

Therefore, in the fourth embodiment, size information of the sheet P is obtained by the sheet sensor 23 provided in the conveyance path 15, in addition to the size information obtained by the size sensor 1723a.

Figure 23A:
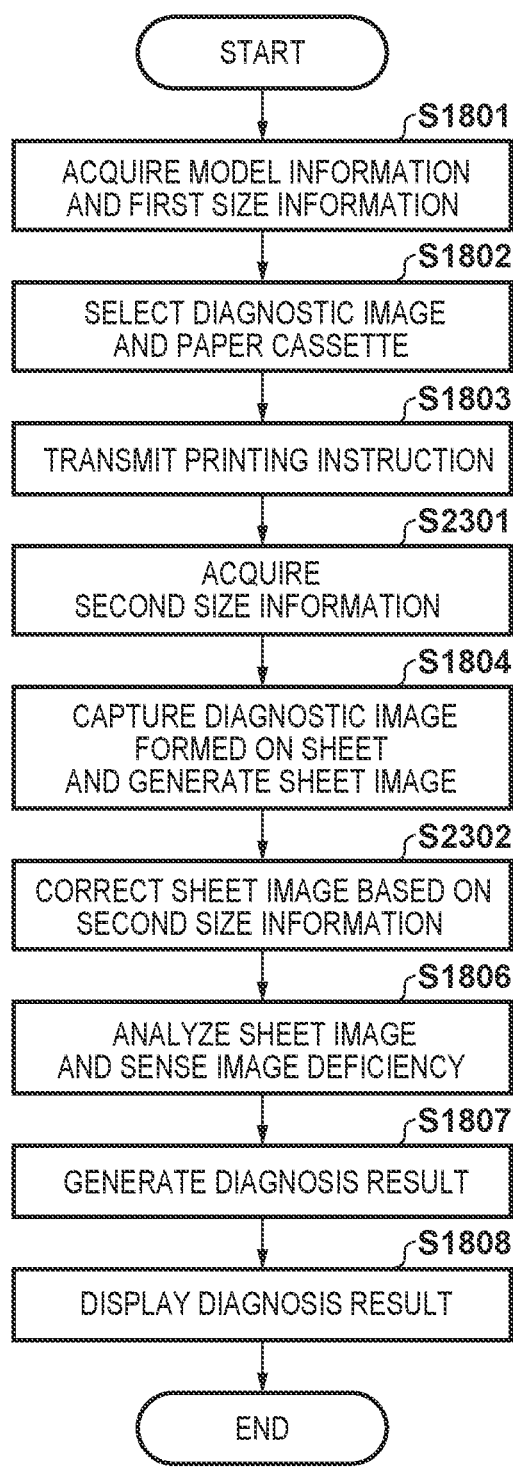

FIG. 23A illustrates an image diagnosis method executed by a CPU provided in the control unit 201 of the image capturing apparatus 102, according to the diagnostic program 206. In FIG. 23A, processes identical or similar to those in FIG. 18A are given the same reference signs, and the descriptions thereof will apply here as well. In the fourth embodiment, the size information 1718 obtained by the size sensor 1723a is denoted as "first size information". The size information 1718 obtained by the sheet sensor 23 is denoted as "second size information". In the fourth embodiment, the first size information is primarily used to select the cassette 13, while the second size information is used to correct the sheet image.

When step S1803 ends, the control unit 201 proceeds to step S2301. In step S2301, the control unit 201 obtains the second size information from the image forming apparatus 101 through the communication unit 204. For example, a request signal for obtaining the second size information may be transmitted. The control unit 201 then moves to step S1804, and generates the sheet image 208. In step S2302, the control unit 201 corrects the sheet image 208 based on the second size information. Step S2302 is similar to step S1805. The first size information is used in step S1805, while the second size information is used in step S2302. Compared to the first size information, the second size information is more accurate. As such, the sheet image 208 is more accurately corrected, the measurement of the characteristics of the image deficiency is more accurate, and the diagnosis result is therefore more accurate as well.

Figure 23B:
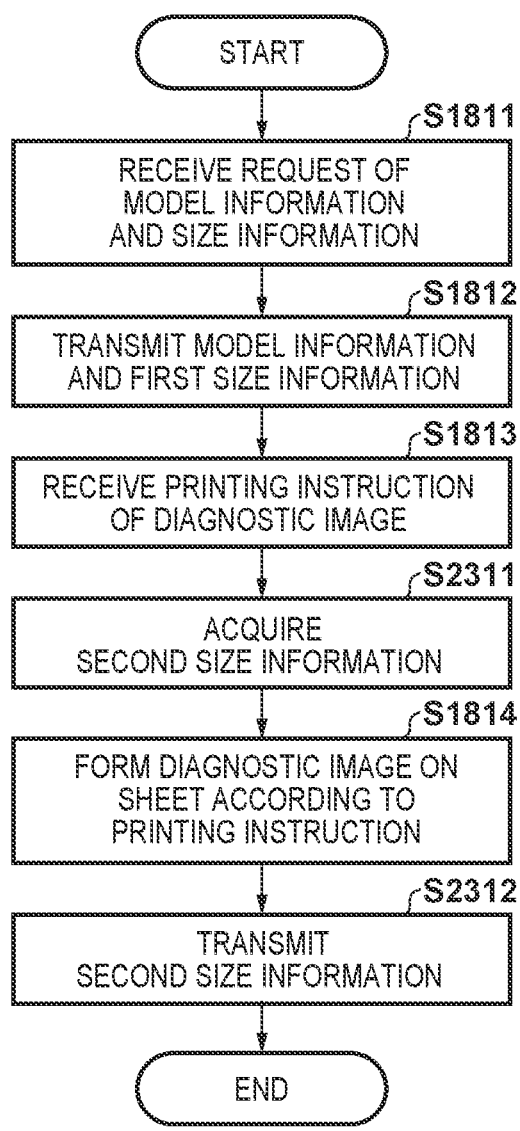

FIG. 23B illustrates a method for providing the model information 1716, the first size information, and the second size information, executed by the CPU 1711 of the image forming apparatus 101. In FIG. 23A, processes identical or similar to those in FIG. 18A are given the same reference signs, and the descriptions thereof will apply here as well.

As illustrated in FIG. 23B, step S2311 is added as a new step between steps S1813 and S1814. In addition, step S2312 is added after step S1814. Step S2312 may be added before step S1814.

In step S2311, the CPU 1711 obtains the size information 1718 (the second size information) of the sheet P using the sheet sensor 23. When the sheet sensor 23 is a sensor that senses the presence or absence of sheet P, the CPU 1711 uses a timer or counter to measure the time over which the sheet sensor 23 senses the following edge of the sheet P from the leading edge (a transit time T). The CPU 1711 may calculate the length of the long side of the sheet P by multiplying the transit time T by the conveyance speed (e.g., 180 mm/s). This calculation may be executed by the control unit 201. In this case, the control unit 201 may identify the conveyance speed based on the model information 1716, or may be notified of the conveyance speed by the CPU 1711. In this manner, the CPU 1711 obtains the second size information. The CPU 1711 then executes step S1814, and moves to step S2312. Note that if the second size information only indicates the length of the long side (the length in the conveyance direction) of the sheet P, the length of the short side (the length in the width direction) of the sheet P may be obtained from the first size information.

In step S2312, the CPU 1711 transmits the second size information through the communication unit 41. The second size information may be any information making it possible to identify the size of sheet P, and can be (i) the length of the long side of sheet P or (ii) the transit time T and conveyance speed.

The foregoing descriptions assume that the sheet sensor 23 can measure the length of the sheet P in the conveyance direction. However, instead of the sheet sensor 23, the second size sensor 1723b installed in the conveyance path 15 may sense the length of sheet P in the conveyance direction and the length of the sheet P in the width direction. The size sensor 1723b may be a sensor that utilizes a line sensor. In this case, the line sensor extends in a direction orthogonal to the conveyance direction in the conveyance path 15. As a result, the second size information may include both the length of the long side and the length of the short side of the sheet P. In this case, the length of the long side and the length of the short side of the sheet P, obtained from the second size information, are used in the image correction of step S2302. The first size information obtained by the first size sensor 1723a provided in the cassette need not be used for image correction.

According to the fourth embodiment, the second size information, which is more accurate than the first size information, is used. As such, the sheet image 208 is more accurately corrected, the measurement of the characteristics of the image deficiency is more accurate, and the diagnosis result is therefore more accurate as well.

Fifth Embodiment

If the diagnostic image 1900 is an image that occupies a broad range of the sheet P, many unfixed toner images are transferred to the sheet P at the secondary transfer section. An unfixed toner image has a lubricating effect between the intermediate transfer belt 8 and the sheet P. As a result, the sheet P may slip, reducing the conveyance speed of sheet P and resulting in an inaccurate measurement result of the sheet P by the sheet sensor 23. Accordingly, in the fifth embodiment, the sheet P for which the size is measured by the sheet sensor 23 or the second size sensor 1723b and the sheet P on which the diagnostic image 1900 is printed are different sheets P. In particular, the sheet P for which the size is measured has less toner transferred than the sheet P on which the diagnostic image 1900 is printed. For example, the sheet P for which the size is to be measured may have no toner transferred at all.

FIG. 24A illustrates an image diagnosis method executed by a CPU provided in the control unit 201 of the image capturing apparatus 102, according to the diagnostic program 206. In FIG. 24A, processes identical or similar to those in FIG. 18A or FIG. 23A are given the same reference signs, and the descriptions thereof will apply here as well. Note that the user stores a plurality of the sheets P in the upper cassette 13a in advance. This may be achieved by the control unit 201 displaying a message in the interface unit 202 prompting the user to perform such storage. In the fifth embodiment, steps S2401 and S2402 are inserted between steps S1802 and S1803. The sheet P on which the measurement image is formed and the sheet P on which the diagnostic image 1900 is formed are each the same brand and from the same production lot. Generally, the sheets P are contained in a single package containing a predetermined number of sheets (e.g., 1,000 sheets). Therefore, a sheet P on which a measurement image is formed and a sheet P on which the diagnostic image 1900 is formed may be sheets P sold in the same package. Doing so is likely to result in a very small error between the size of the sheet P on which the measurement image is formed and the size of the sheet P on which the diagnostic image 1900 is formed.

In step S2401, the control unit 201 transmits, to the image forming apparatus 101, a printing instruction for a measurement image suited to measuring the size of the sheet P. The "measurement image" is an image that is less likely to cause a drop in the conveyance speed due to unfixed toner images compared to the diagnostic image 1900. For example, the measurement image is a solid white image to which no toner is transferred, or an image to which a small amount of toner is transferred. The cassette specified by the printing instruction for the measurement image is basically the same as the cassette specified by the printing instruction for the diagnostic image 1900. This improves the accuracy of the correction of the sheet image.

In step S2402, the control unit 201 obtains the second size information from the image forming apparatus 101 through the communication unit 204. Here, the second size information includes size information obtained based on the sheet P on which the measurement image is formed. The second size information may be any information making it possible to identify the size of sheet P, and can be (i) the length of the long side of sheet P or (ii) the transit time T and conveyance speed.

The second size information is then used in step S2302 to correct the sheet image 208. As described with reference to FIGS. 20A and 20B, the image region 2002 is corrected such that the lengths U1, V1, W1, and X1 of the four sides match the second size information. Incidentally, the control unit 201 may tentatively correct the image region 2002 such that the lengths U1, V1, W1 and X1 of the four sides match the first size information, as described in the third embodiment. The control unit 201 may then correct the image region 2002 again such that the lengths U1, V1, W1, and X1 of the four sides of the corrected image region 2002 match the second size information.

According to the fifth embodiment, the second size information is obtained using a different sheet P from the sheet P on which the diagnostic image 1900 is formed. In particular, the sheet P on which the measurement image is formed is less likely to experience a drop and variations in the conveyance speed than the sheet P on which the diagnostic image 1900 is formed. Accordingly, the length of the sheet P in the conveyance direction can be obtained more accurately. As a result, the fifth embodiment can provide even more accurate diagnosis results compared to the fourth embodiment.

Sixth Embodiment

Figure 25:
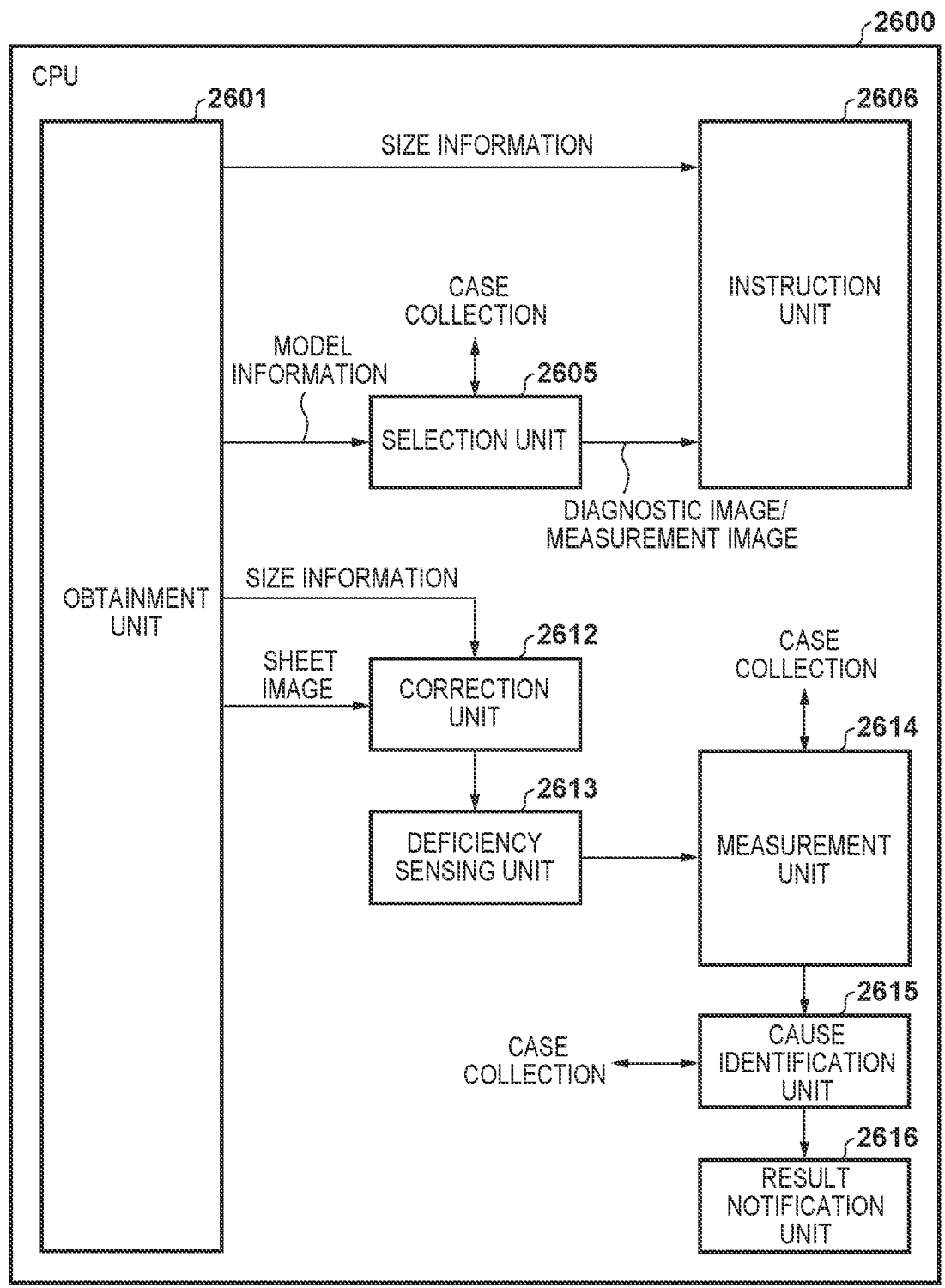
FIG. 25 is a diagram illustrating functions of a CPU.

FIG. 25 illustrates an example of the functions realized by a CPU 2500, which can be provided in the control unit 201 or 1701, executing the diagnostic program 206. The plurality of functions illustrated in FIG. 25 may be distributed throughout the control units 201 and 1701 and the control unit 40, or may be centralized in one of the control units 201 and 1701 and the control unit 40. However, it is sufficient for only the camera 203, which captures images photographically, to be provided independently of the image forming apparatus 101.

An obtainment unit 2501 obtains the size information 1718 from the image forming apparatus 101 or the interface unit 202. The obtainment unit 2501 obtains the model information 1716 of the image forming apparatus 101. The obtainment unit 2501 obtains the sheet image 208 generated by the camera 203. In other words, the obtainment unit 2501 functions as an acquisition unit that acquires the sheet image 208 obtained by capturing an image of the sheet P on which the diagnostic image 1900 has been formed by the image forming apparatus 101.

A selection unit 2505 selects the diagnostic image 1900 corresponding to the model information 1716 by referring to the case collection 210. The selection unit 2505 may select the diagnostic image 1900 corresponding to the model information 1716 and the history data 1717 by referring to the case collection 210. Furthermore, the selection unit 2505 may select the measurement image and pass the measurement image to an instruction unit 2506 before the diagnostic image. The instruction unit 2506 selects the cassette 13a based on the size information 1718. For example, the size information 1718 may indicate that cassette 13a contains A4-size sheets Pa and cassette 13b contains B5-size sheets Pb. In this case, the instruction unit 2506 selects the cassette 13a and reflect the selection in the printing instruction. The instruction unit 2506 transmits the printing instruction for the image selected by the selection unit 2505 to the image forming apparatus 101.

A correction unit 2512 corrects the image region 2001 in the sheet image 208 to the image region 2002 based on the size information 1718 obtained by the sheet sensor 23, the size sensors 1723, or the like. As described above, the correction unit 2512 rotates the image region 2001 such that the tilt 60 of the image region 2001 is zero. The correction unit 2512 deforms the image region 2001 such that the angles α0, β0, γ0 and δ0 of the four corners of the image region 2001 are 90 degrees each. Furthermore, the correction unit 2512 changes the lengths U0, V0, W0, and X0 of the four sides so as to match the size information 1718. As a result, a sheet image 208 that includes the corrected image region 2002 is generated.

A deficiency sensing unit 2513 refers to the case collection 210 and senses an image deficiency (e.g., the afterimage 1903) and the like from the image region 2002. The case collection 210 includes characteristics of image deficiencies (the size of the afterimage 1903 and a density difference from the single-color pattern 1901) and the like. A measurement unit 2514 refers to the case collection 210 and measures the characteristics (e.g., L1, L2, L3, L4) of the image deficiency. A cause identification unit 2515 refers to the case collection 210, identifies a causative component corresponding to the characteristics obtained by the measurement unit 2514 and a countermeasure method (e.g., replacement, repair, cleaning) corresponding to the causative component, and generates a diagnosis result. A result notification unit 2516 generates a diagnosis result and outputs the diagnosis result to the interface units 202, 1702, and 1712. The interface units 202, 1702, and 1712 display the diagnosis result.

Technical Spirit Derived from Embodiments

As described above, the diagnostic system 100 has the camera 203, a reception function for receiving an image from the camera 203, a diagnostic function, and a notification function. Here, the reception function, the diagnostic function, and the notification function may be provided in the image capturing apparatus 102, or may be provided in another device. For example, the reception function, the diagnostic function, and the notification function may be distributed among the image forming apparatus 101, the image capturing apparatus 102, and the server 103 (information processing apparatus) including a personal computer. For example, the image capturing apparatus 102 may only obtain the sheet image 208, and the remaining functions may be provided in an information processing apparatus such as a personal computer.

The diagnostic apparatus may be implemented by a single application program by having the image capturing apparatus 102 also function as the diagnostic apparatus, as described in the foregoing embodiments. This makes it possible to improve the convenience for a worker.

Aspects B1 and B19 to B22

The image forming apparatus 101 is an example of an image forming apparatus that forms the diagnostic image 1900 on the sheet P. The image capturing apparatus 102 and the camera 203 are examples of an image capturing apparatus that captures an image of the sheet P on which the diagnostic image 1900 has been formed by the image forming apparatus 101 and outputs the sheet image 208. The control units 201 and 1701 and the communication unit 1704 may function as a reception unit that receives the sheet image from the image capturing apparatus that outputs the sheet image (the camera 203). The image capturing apparatus 102 and the server 103 are examples of the diagnostic apparatus that diagnoses the image forming apparatus 101 based on the sheet image 208. The control unit 201, the interface unit 202, and the communication unit 204 are examples of an obtainment unit that obtains the size information 1718 indicating the size of the sheet P. The control units 201 and 1701 function as a diagnosis unit that makes a diagnosis for a component of the image forming apparatus 101 based on the size information 1718 and a position of an image deficiency in the sheet image 208. The interface units 202 and 1702 and the communication units 204 and 1704 function as an output unit that outputs a diagnosis result from the diagnosis unit. In this manner, according to the third embodiment, using the image capturing apparatus 102 makes it possible to diagnose the image forming apparatus 101 more easily than before. Furthermore, the size information 1718 of the sheet P on which the diagnostic image 1900 is formed is used in the diagnosis, and thus more accurate diagnosis results can be expected.

Aspect B2

The control units 201 and 1701 may resize the image region 2001 on the sheet P appearing in the sheet image 208 based on the size information 1718. Furthermore, the control units 201 and 1701 may make the diagnosis of the component of the image forming apparatus 101 based on the position of the image deficiency in the image region 2002 resulting from the resizing. The image capturing apparatus 102 captures a photograph while being held in the user's hand, and it is thus easy for the image region 2001 in the sheet image 208 to become distorted. Accordingly, correcting the image region 2001 based on the size information 1718 results in a more accurate diagnosis result.

Aspect B3

The size information 1718 may include at least one of a length of a long side of the sheet P and a length of a short side of the sheet P. One of the length of the long side and the length of the short side may be used to estimate the length of the other. This is because the length of the long side and the length of the short side are already known for standard sizes such as A4, B5, and the like.

Aspect B4

The size information 1718 may include both the length of a long side of the sheet P and the length of a short side of the sheet P. The control units 201 and 1701 may resize the image region 2001 in the sheet P such that the length of the long side and the length of the short side of the image region 2001 of the sheet P appearing in the sheet image 208 approach the lengths of the long side and the short side of the sheet P included in the size information 1718. As a result, the image region 2001 is corrected more accurately, which will make the diagnosis result more accurate as well.

Aspect B5

The server 103 (this may be a personal computer) is an example of an information processing apparatus capable of communicating with the image forming apparatus 101. The control unit 201 may obtain the size information 1718 through the information processing apparatus.

Aspect B6

The sheet sensor 23 and the size sensors 1723a and 1723b are examples of a sensing unit that senses the size of the sheet P. The control units 201 and 1701 may obtain the size information 1718 indicating the size of the sheet P sensed by the sensing unit.

Aspect B7

The cassettes 13a and 13b are examples of holding units capable of holding a plurality of sheets. The size sensor 1723a may be configured to sense the size of the sheets P held in the holding unit.

Aspects B8 and B9

The conveyance path 15 is an example of a conveyance path along which the sheet P is conveyed. The sheet sensor 23 and the size sensor 1723b may be configured to sense the size of the sheet P in the conveyance path 15. This will make it possible to obtain even more accurate size information 1718. The sheet sensor 23 and the size sensor 1723b may sense the size of the sheet P conveyed along the conveyance path 15 based on the transit time T of the sheet P and the conveyance speed of that sheet.

Aspect B10

The size sensor 1723b may include a plurality of light-receiving elements disposed in a direction orthogonal to the conveyance direction of the sheet P in the conveyance path 15. Furthermore, the size sensor 1723b may be configured to sense the size of the sheet P in the direction orthogonal to the conveyance direction of the sheet P based on light reception results from the plurality of light-receiving elements. This makes it possible to obtain not only the length of the sheet P in the conveyance direction, but also the length of the sheet P in the width direction.

Aspect B11

As described in the fifth embodiment, the sheet P for which the size is sensed by the sensing unit and the sheet P on which the diagnostic image is formed may be different sheets. This may further increase the accuracy of the size information of the sheet P.

Aspect B12

The information processing apparatus (e.g., the server 103 and the personal computer) may include a notification unit (e.g., the interface unit 1702) that makes a notification of the diagnosis result. This makes it possible to notify the user of the information processing apparatus of the diagnosis result as well.

Aspects B13 and B14

The diagnosis result may include information indicating the component estimated to be a cause of the image deficiency (e.g., the photosensitive member 1). Through this, the user will easily be able to understand which component requires maintenance. The diagnosis result may include information indicating a response method (countermeasure) for reducing the image deficiency. Through this, the user will easily be able to understand which type of maintenance is required.

Aspects B15, B16, and B21

The diagnostic apparatus (e.g., the control unit 201) and the image capturing apparatus 102 may be contained within a single housing. In other words, the image capturing apparatus 102 may function as the diagnostic apparatus. The diagnostic apparatus and the image capturing apparatus 102 may be realized by a camera-equipped mobile communication device (e.g., a smartphone or a tablet terminal), or by a digital camera. Camera-equipped mobile communication device have become extremely commonplace. Accordingly, the user can download the diagnostic program 206 from a server device and install the program in the camera-equipped mobile communication device. In other words, the user will be able to introduce the diagnostic apparatus with ease.

Aspect B17

The diagnostic apparatus may be provided in the image forming apparatus 101. In this case, some of the processing described above as being executed by the control unit 201 (e.g., steps S1805 to S1808) is instead executed by the control unit 40. Even in such a case, the image capturing apparatus 102 is provided independent from the image forming apparatus 101. In other words, the image capturing apparatus 102 still obtains the sheet image 208. This will make it possible for even an image forming apparatus 101 that does not have an image sensor to execute diagnostic processing.

Aspect B18

The diagnostic apparatus may be installed in a server computer (e.g., the server 103) capable of communicating with the image capturing apparatus 102. Accordingly, diagnosis results can be obtained even when the information processing capabilities of the image capturing apparatus 102 are low or there is little free space in the storage unit 205.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-142697, filed Sep. 1, 2021 and Japanese Patent Application No. 2021-142698, filed Sep. 1, 2021 are hereby incorporated by reference herein in their entirety.

What is claimed is:

1. A diagnostic system comprising:
an image forming apparatus configured to form a diagnostic image on a sheet; and
an image capturing apparatus configured to capture an image of the sheet on which the diagnostic image is formed and which has been discharged from the image forming apparatus, and outputs the captured image as a sheet image,
wherein the image capturing apparatus comprises one or more processor configured to:
make a diagnosis for a component of the image forming apparatus based on a position of an image deficiency in the sheet image;
output a diagnosis result for the component of the image forming apparatus,
obtain direction information pertaining to a direction in which the image forming apparatus forms the diagnostic image with respect to the sheet; and
make the diagnosis for the component of the image forming apparatus using the direction information and the position of the image deficiency in the sheet image.

2. The diagnostic system according to claim 1, wherein the one or more processor is further configured to determine a reference position serving as a reference for the diagnosis based on the direction information, and based on a distance from the reference position to the position of the image deficiency, identify a component, among a plurality of components constituting the image forming apparatus, that is a cause of the image deficiency.

3. The diagnostic system according to claim 1, wherein the one or more processor is further configured to set a print direction of the diagnostic image in the image forming apparatus based on the direction information such that an orientation of the diagnostic image matches a conveyance direction of the sheet.

4. The diagnostic system according to claim 3, wherein the orientation of the diagnostic image matching the conveyance direction of the sheet is a header side of the diagnostic image matching a leading edge side of the sheet in the conveyance direction of the sheet.

5. The diagnostic system according to claim 1, wherein the one or more processor is further configured to obtain the direction information from the image forming apparatus.

6. The diagnostic system according to claim 1,
wherein the image capturing apparatus further comprises communication circuitry that communicates with a server, and
the one or more processor is further configured to obtain the direction information from the server.

7. The diagnostic system according to claim 6, wherein the one or more processor is further configured to obtain the direction information from the server by transmitting identification information of the image forming apparatus to the server.

8. The diagnostic system according to claim 1,
wherein the image capturing apparatus further comprises an input unit that accepts a user input, and
the one or more processor is further configured to obtain the direction information through the input unit.

9. The diagnostic system according to claim 8,
wherein the one or more processor is further configured to:
instruct the image forming apparatus to form a direction determination image on the sheet; and
obtain the direction information based on information input by a user after the direction determination image is formed on the sheet.

10. The diagnostic system according to claim 9, wherein the one or more processor is further configured to obtain the direction information based on a user input pertaining to whether an orientation of the direction determination image matches a discharge direction of the sheet, on which the direction determination image is formed, from the image forming apparatus.

11. The diagnostic system according to claim 1, wherein the component is a rotating body.

12. The diagnostic system according to claim 11, wherein the one or more processor is further configured to identify a rotating body that is a cause of the image deficiency based on a distance correlated with a rotation cycle of the rotating body and a distance obtained from the position of the image deficiency.

13. The diagnostic system according to claim 1, wherein the diagnostic image is any image prepared by a user.

14. The diagnostic system according to claim 1, wherein the diagnostic image includes a first pattern formed from toner of a single color and a second pattern formed by mixing a plurality of different colors.

15. The diagnostic system according to claim 14, wherein in the image forming apparatus, the first pattern is formed before the second pattern.

16. The diagnostic system according to claim 1, wherein the diagnostic image includes a single-color pattern region containing a pattern of a single color, and a white region or a mixed-color pattern region formed further on a footer side of the diagnostic image than the single-color pattern region.

17. The diagnostic system according to claim 1, wherein the diagnosis result includes information indicating the component that is the cause of the image deficiency.

18. The diagnostic system according to claim 1, wherein the image capturing apparatus includes a digital camera or a portable communication device equipped with a camera.

19. An image capturing apparatus comprising:
an imaging sensor configured to capture an image of a sheet on which a diagnostic image has been formed by an image forming apparatus to be diagnosed, and outputs the captured image as a sheet image; and
one or more processor configured to:
make a diagnosis for a component of the image forming apparatus based on a position of an image deficiency in the sheet image;
output a diagnosis result for the component of the image forming apparatus;
obtain direction information pertaining to a direction in which the image forming apparatus forms the diagnostic image with respect to the sheet; and
make the diagnosis for the component of the image forming apparatus using the direction information and the position of the image deficiency in the sheet image.

20. A non-transitory computer-readable storage medium storing a program for causing an image capturing apparatus to execute processing comprising:
capturing an image of a sheet on which a diagnostic image has been formed by an image forming apparatus to be diagnosed, and outputting the captured image as a sheet image;
making a diagnosis for a component of the image forming apparatus based on a position of an image deficiency in the sheet image;
outputting a diagnosis result for the component of the image forming apparatus;
obtaining direction information pertaining to a direction in which the image forming apparatus forms the diagnostic image with respect to the sheet; and
making the diagnosis for the component of the image forming apparatus using the direction information and the position of the image deficiency in the sheet image.

21. The non-transitory computer-readable storage medium according to claim 20,
wherein the program is further configured to cause the image capturing apparatus to execute processing comprising:
obtaining size information indicating a size of the sheet;
transmitting, to the image forming apparatus, an instruction to cause the image forming apparatus to form the diagnostic image on the sheet; and
making the diagnosis for the component of the image forming apparatus based on the size information and the position of the image deficiency in the sheet image.

22. The non-transitory computer-readable storage medium according to claim 21,
wherein the image capturing apparatus includes a portable communication device equipped with a camera or a digital camera.

23. A diagnostic system comprising:
an image forming apparatus configured to form a diagnostic image on a sheet;
an image capturing apparatus configured to capture an image of the sheet on which the diagnostic image is formed and which has been discharged from the image forming apparatus, and outputs the captured image as a sheet image; and a diagnostic apparatus configured to make a diagnosis for a component of the image forming apparatus based on a position of an image deficiency in the sheet image obtained by the image capturing apparatus, and outputs a diagnosis result for the component of the image forming apparatus, wherein the diagnostic apparatus is further configured to:

obtain direction information pertaining to a direction in which the image forming apparatus forms the diagnostic image with respect to the sheet; and make the diagnosis for the component of the image forming apparatus using the direction information and the position of the image deficiency in the sheet image.

24. The diagnostic system according to claim 23, wherein the diagnostic apparatus comprises one or more processor configured to:

obtain size information indicating a size of the sheet;

make the diagnosis for the component of the image forming apparatus based on the size information and the position of the image deficiency in the sheet image; and output a diagnosis result for the component of the image forming apparatus.

* * * * *